US009798158B2

(12) United States Patent
Terada

(10) Patent No.: US 9,798,158 B2
(45) Date of Patent: Oct. 24, 2017

(54) OPTICAL APPARATUS CAPABLE OF RETRACTING OPTICAL ELEMENT FROM OPTICAL PATH

(71) Applicant: CANON KABUSHIKI KAISHA, Tokyo (JP)

(72) Inventor: Shuichi Terada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 108 days.

(21) Appl. No.: 14/568,827

(22) Filed: Dec. 12, 2014

(65) Prior Publication Data

US 2015/0168683 A1 Jun. 18, 2015

(30) Foreign Application Priority Data

Dec. 17, 2013 (JP) ................................. 2013-260199
Nov. 12, 2014 (JP) ................................. 2014-229615

(51) Int. Cl.

| G02B 27/64 | (2006.01) |
|---|---|
| G02B 7/14 | (2006.01) |
| G03B 5/06 | (2006.01) |
| G02B 15/02 | (2006.01) |
| G02B 7/10 | (2006.01) |
| G03B 17/04 | (2006.01) |
| G03B 15/14 | (2006.01) |
| G02B 15/14 | (2006.01) |

(52) U.S. Cl.
CPC ........... *G02B 27/646* (2013.01); *G02B 7/102* (2013.01); *G02B 7/14* (2013.01); *G02B 15/02* (2013.01); *G03B 5/06* (2013.01); *G02B 15/14* (2013.01); *G03B 17/04* (2013.01); *G03B 2205/0015* (2013.01)

(58) Field of Classification Search
CPC .............. G02B 15/04–15/12; G03B 5/00–5/08
USPC .......................... 359/817, 811, 672–675, 557
See application file for complete search history.

(56) References Cited

U.S. PATENT DOCUMENTS

| 8,078,041 B2 | 12/2011 | Kudoh | |
|---|---|---|---|
| 8,830,583 B2 * | 9/2014 | Suzuka | ..................... G02B 7/14 |
| | | | 359/554 |

(Continued)

FOREIGN PATENT DOCUMENTS

| JP | 4781439 B2 | 9/2011 |
|---|---|---|
| JP | 2012-141401 A | 7/2012 |

*Primary Examiner* — Zachary Wilkes
(74) *Attorney, Agent, or Firm* — Rossi, Kimms & McDowell LLP

(57) ABSTRACT

An optical apparatus that is capable of improving impact resistance thereof. A holding member holding the optical element is movably attached to a first member so that the optical element is movable between an entering position where the optical element enters into an optical path and a retracted position where the optical element is retracted from the optical path. The first member is movably attached to a second member. A driving member engages with the holding member and drives the holding member. A regulation member regulates a moving amount of the first member with respect to the second member. The regulation member is arranged so that a distance from an engagement position of the holding member and the driving member at the entering position to the regulation member is longer than a distance from the engagement position at the retracted position to the regulation member.

12 Claims, 26 Drawing Sheets

(56) References Cited

U.S. PATENT DOCUMENTS

| | | | | |
|---|---|---|---|---|
| 2006/0018654 A1* | 1/2006 | Nuno | ................. | G03B 17/04 396/349 |
| 2006/0045517 A1* | 3/2006 | Kato | ................. | G03B 17/04 396/349 |
| 2007/0183764 A1* | 8/2007 | Imura | ................. | G03B 5/02 396/55 |

* cited by examiner

OPTICAL APPARATUS CAPABLE OF RETRACTING OPTICAL ELEMENT FROM OPTICAL PATH

BACKGROUND OF THE INVENTION

Field of the Invention

The invention relates to an optical apparatus that includes an image pickup apparatus, such as a digital camera, a digital video camera, an interchangeable lens for digital single-lens reflex camera, and an observation apparatus, such as a binocular, a telescope, or a field scope. Particularly, the invention relates to an optical apparatus that is capable of retracting an optical element from an optical path.

Description of the Related Art

There is a proposed technique for reducing an effect due to a camera shake occurred at the time of taking an image by moving a correction lens, which is an optical element for image stabilization, in first and second directions that are perpendicular to an optical axis as an image stabilization device mounted in a digital still camera etc. (see to Japanese Laid-Open Patent Publication (Kokai) No. 2012-141401 (JP 2012-141401A)).

According to this proposed technique, a holding member holding the correction lens is moved in the first direction by a first guide unit, and is moved in the second direction by a second guide unit. Moreover, when a lens barrel is collapsed, the holding member is retracted from an optical path by a third guide unit that moves the holding member in a third direction that is perpendicular to the optical axis and a retracting position control cam, and another lens group is located in a space where the correction lens occupies at the time of shooting, which miniaturizes the image pickup apparatus.

Furthermore, there is a proposed technique for making a correction lens eccentric with respect to an optical axis by moving a first lens holding member and a second lens holding member in directions that are perpendicular to the optical axis under a condition where balls are nipped between a base member and the first lens holding member with energization force of extension springs (see Japanese Patent Publication No. 4781439 (JP 4781439B2).

However, JP 2012-141401A does not disclose and suggest measures to meet the situation where impact is applied from the outside to the image stabilization device.

On the other hand, the technique of JP 4781439B2 regulates the movement of the first lens holding member by covering a subject side of the first lens holding member in the optical axis direction with a magnetic detection holding member in order to prevent the balls from being off because impact applied to the first lens holding member from the outside extends the extension springs. However, if the subject side of the first lens holding member in the optical axis direction is covered with the magnetic detection holding member, the image stabilization device becomes large, which enlarges the lens barrel in the optical axis direction.

SUMMARY OF THE INVENTION

The invention provides a mechanism that miniaturizes an optical apparatus, which is capable of retracting an optical element from an optical path, in an optical axis direction and improves impact resistance thereof.

Accordingly, a first aspect of the invention provides an optical apparatus comprising an optical element, a holding member configured to hold the optical element, a first member to which the holding member is movably attached so that the optical element is movable between an entering position where the optical element enters into an optical path and a retracted position where the optical element is retracted from the optical path, a second member to which the first member is movably attached, a driving member configured to engage with the holding member and to drive the holding member between the entering position and the retracted position, and a regulation member configured to regulate a moving amount of the first member with respect to the second member. The regulation member is arranged so that a distance from an engagement part of the holding member and the driving member at the entering position to the regulation member is longer than a distance from the engagement part of the holding member and the driving member at the retracted position to the regulation member.

Accordingly, a second aspect of the invention provides an optical apparatus comprising an optical element, a holding member configured to hold the optical element, a first member to which the holding member is rotatably attached so that the optical element is rotatable between an entering position where the optical element enters into an optical path and a retracted position where the optical element is retracted from the optical path, a second member to which the first member is movably attached, a driving member configured to engage with the holding member and to drive the holding member between the entering position and the retracted position, and a regulation member configured to regulate a moving amount of the first member with respect to the second member. The regulation member is arranged between the optical element at the retracted position and the rotation center of the holding member.

According to the invention, an optical apparatus, which is capable of retracting an optical element from an optical path, is miniaturized in an optical axis direction and impact resistance thereof is improved.

Further features of the invention will become apparent from the following description of exemplary embodiments with reference to the attached drawings.

DESCRIPTION OF THE EMBODIMENTS

Hereafter, embodiments according to the invention will be described in detail with reference to the drawings.

Figure 1:
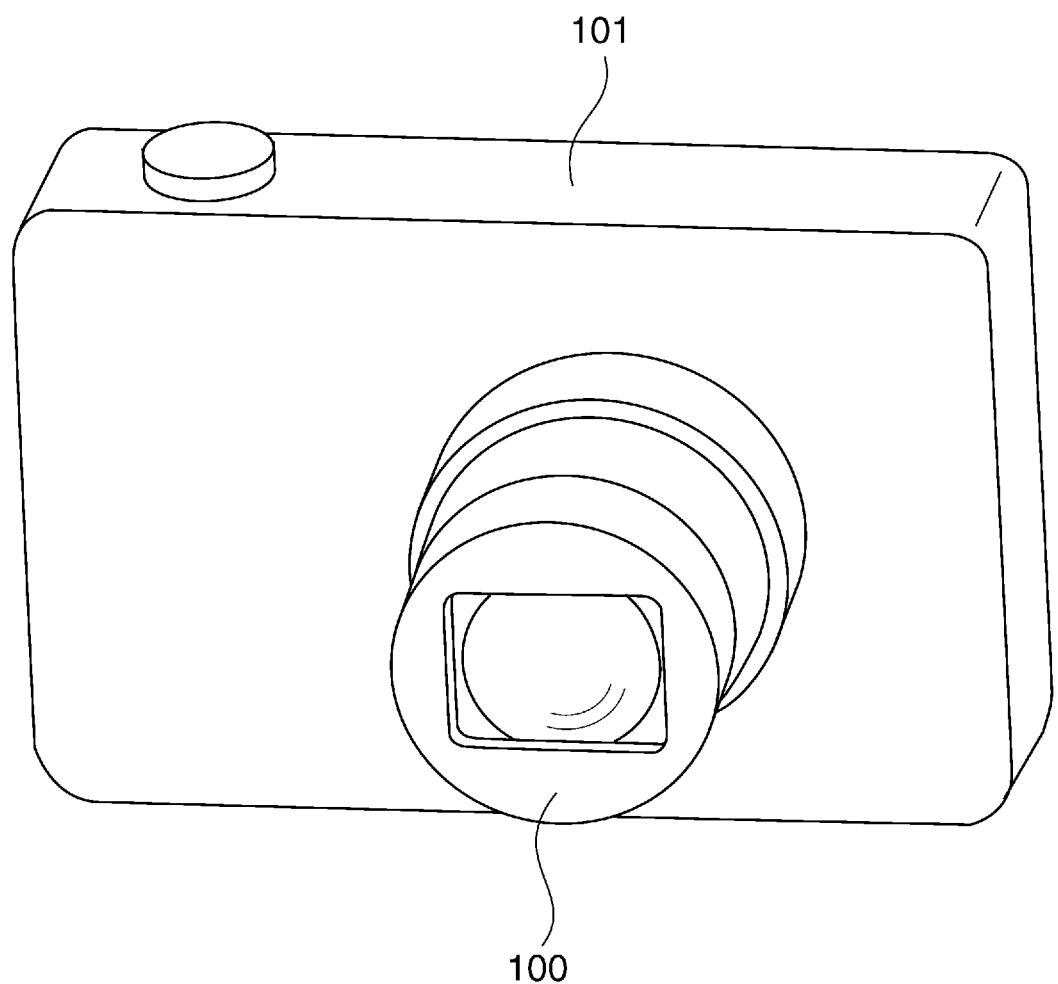
FIG. 1 is a perspective view showing a digital camera of an embodiment of an optical apparatus according to the invention.
Figure 2:
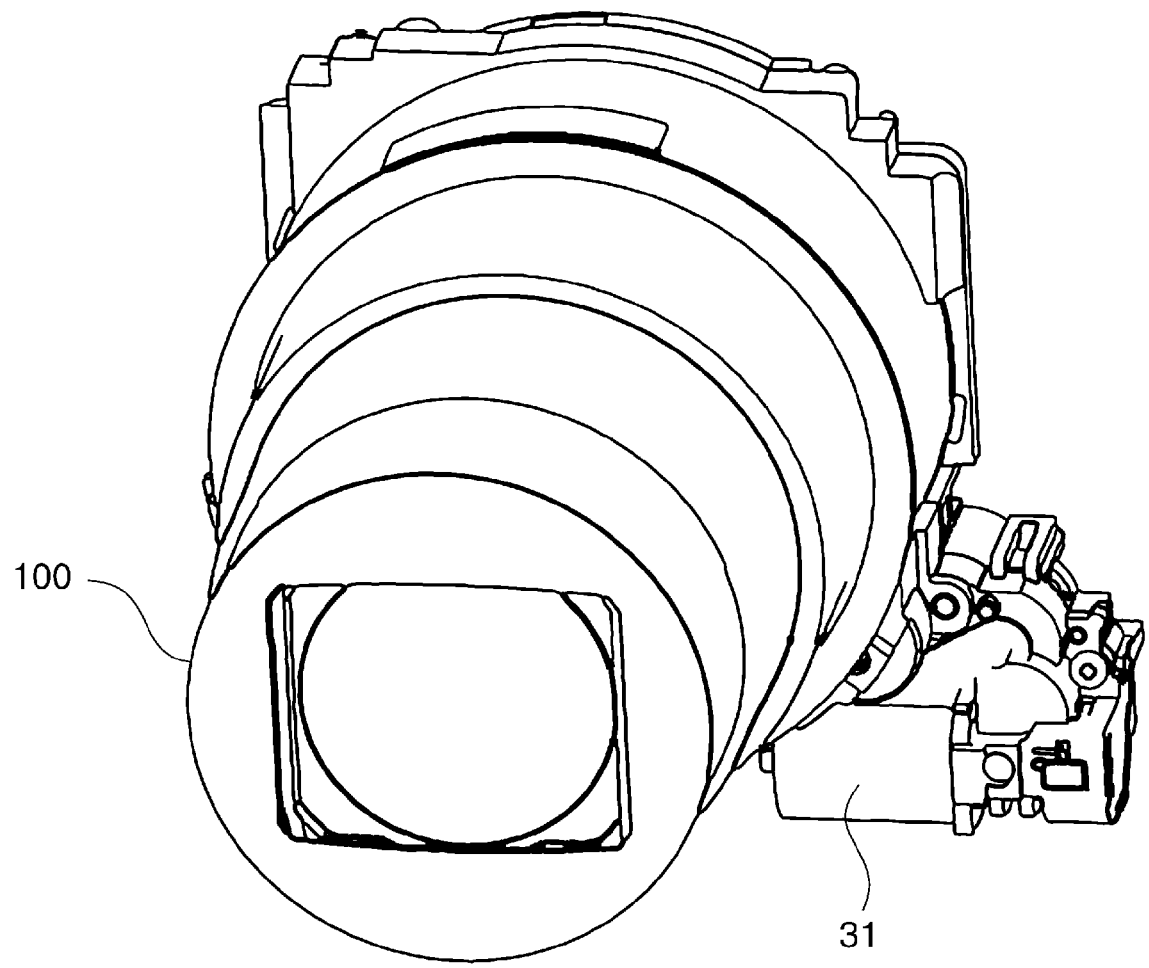
FIG. 2 is a perspective view of a lens barrel mounted in the digital camera shown in FIG. 1.

FIG. 1 is a perspective view showing a digital camera of an embodiment of an optical apparatus according to the invention. FIG. 2 is a perspective view of a lens barrel mounted in the digital camera shown in FIG. 1.

As shown in FIG. 1 and FIG. 2, the digital camera of this embodiment is configured by mounting a lens barrel 100 of a zoom lens type to the front side of a camera body 101. The lens barrel 100 changes shooting magnification by moving lens groups that constitute an image pickup optical system in an optical axis direction between a shooting state and a collapsed state by using a zoom actuator 31.

Figure 3:
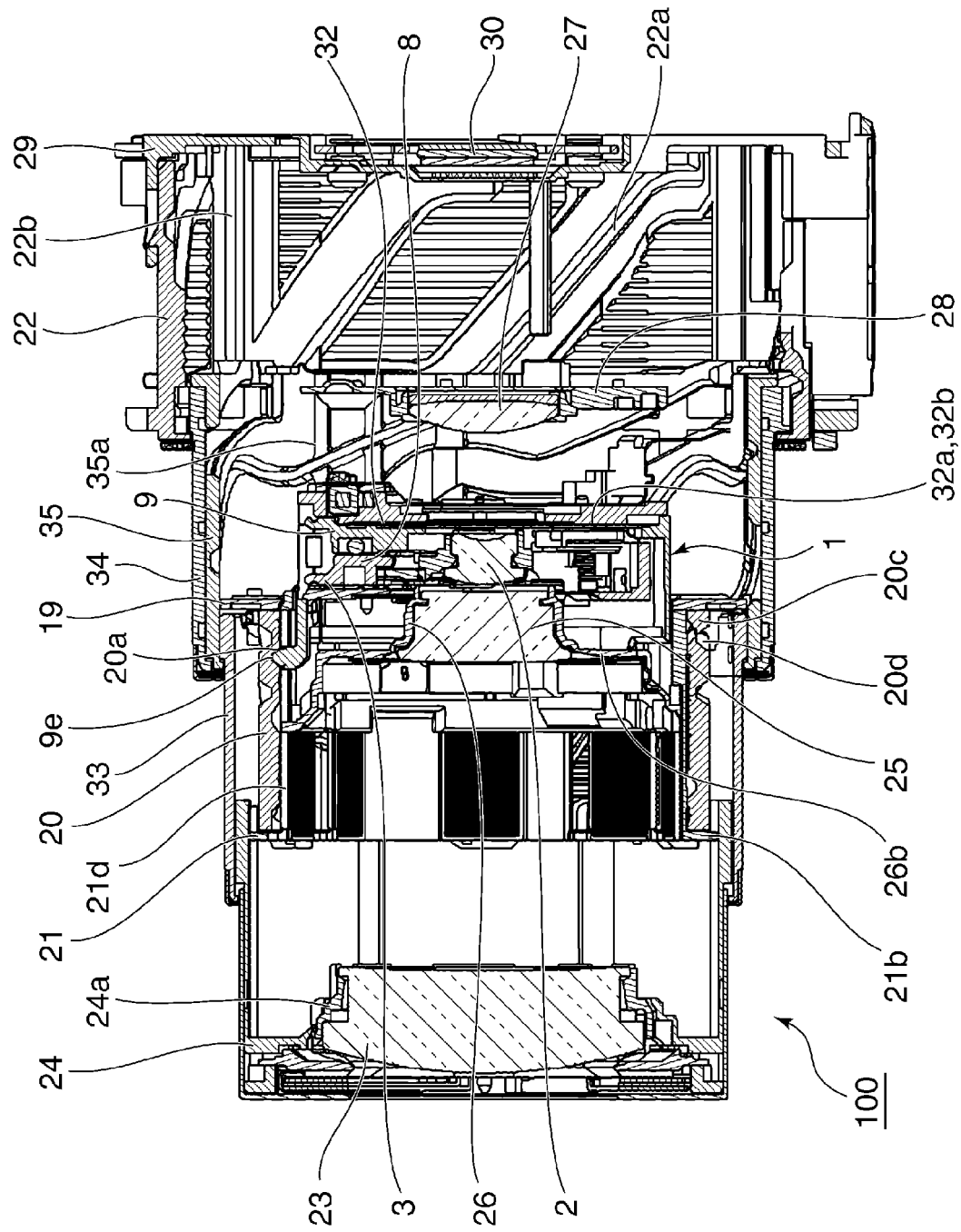
FIG. 3 is a sectional view showing the lens barrel shown in FIG. 2 in a shooting state.
Figure 4:
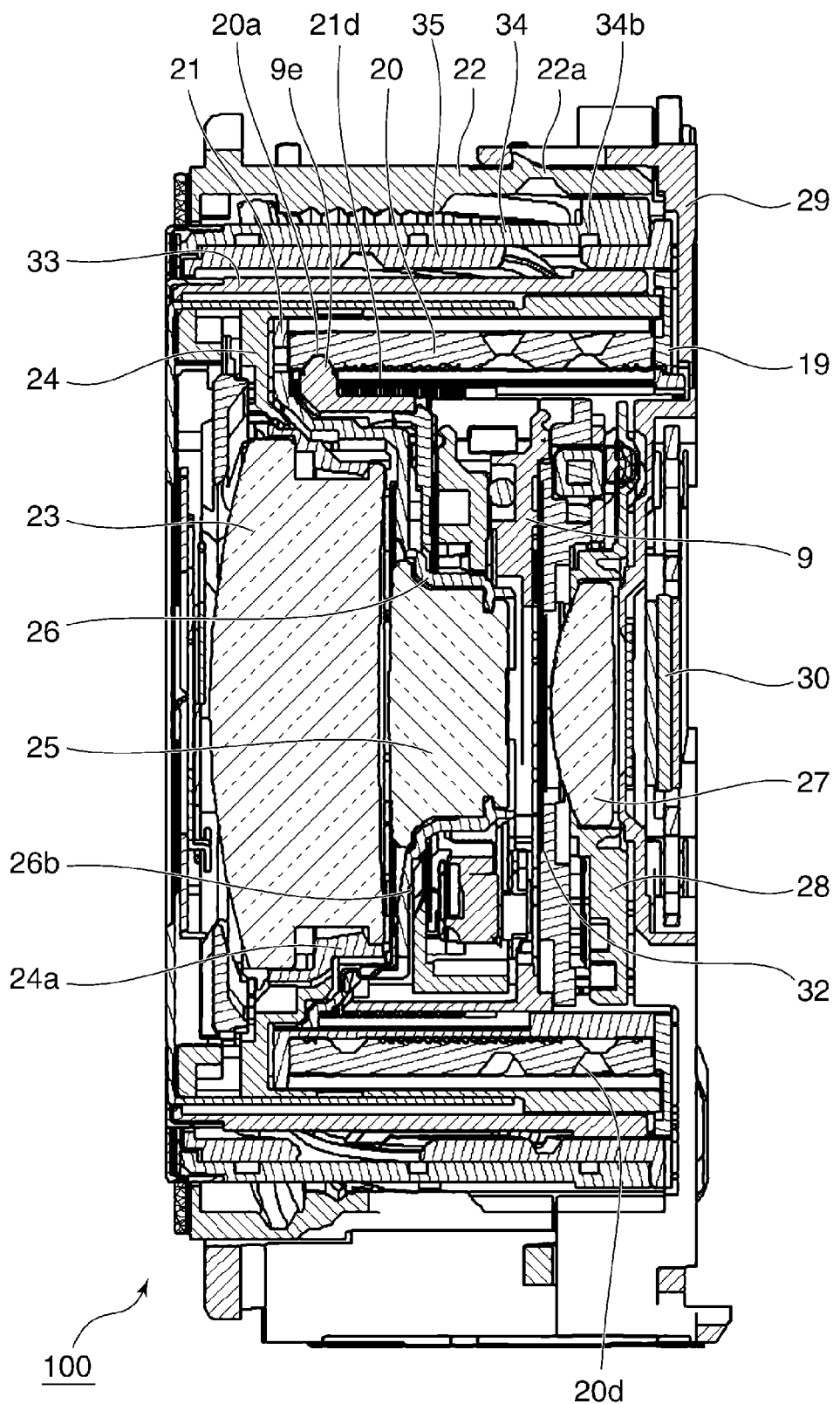
FIG. 4 is a sectional view showing the lens barrel shown in FIG. 2 in a collapsed state.

FIG. 3 is a sectional view of the lens barrel 100 in the shooting state. FIG. 4 is a sectional view of the lens barrel 100 in the collapsed state.

As shown in FIG. 3 and FIG. 4, the image pickup optical system of the lens barrel 100 consists of a first group lens 23, a second group lens 25, a third group lens 2, a shutter unit 32, and a fourth group lens 27 in this embodiment. A subject image is formed on an image pickup device 30 through the image pickup optical system, and is converted photoelectrically. It should be noted that the third group lens 2 is not shown in FIG. 4 because it is retracted from an optical path in the collapsed state. Moreover, although the lens surface of the first group lens 23 at the side of the image pickup device 30 is a concave surface, it may be a flat surface or an approximately flat convex surface.

The lens barrel 100 has a fixed barrel 22, an outside cam barrel 34, an outside rectilinear barrel 35, an inside cam cover 33, a first group barrel 24, an inside cam barrel 20, and an inside rectilinear barrel 21, which are arranged in this order from the outside to the inside.

The first group lens 23 is supported by a first group holder 24a of the first group barrel 24. The second group lens 25 is supported by a second group holder 26 arranged inside the inside cam barrel 20.

The third group lens 2 is supported by a third group holder 3, and this third group holder 3 is supported by a third group frame 8 attached to a third group base plate 9 that is arranged inside the inside cam barrel 20. The third group lens 2, the third group holder 3, the third group base plate 9, and the third group frame 8 constitute a part of an image stabilization device 1 mentioned later. A shutter unit 32 that has shutter blades 32a and 32b is also attached to the third group base plate 9.

The fourth group lens 27 is supported by a fourth group holder 28 fixed to the inner circumference side of the outside rectilinear barrel 35. The image pickup device 30 is supported by a sensor holder 29 fixed to the camera body 101. It should be noted that the fixed barrel 22 and the zoom actuator 31 are supported by the sensor holder 29.

Next, a cam mechanism for moving the lens groups in an optical axis direction will be described. Three cam grooves 22a are formed in the inner periphery of the fixed barrel 22 at nearly regular intervals in the circumferential direction. Three followers (not shown) provided in the outer periphery of the outside cam barrel 34 at nearly regular intervals in the circumferential direction engage with the cam grooves 22a, respectively. When the outside cam barrel 34 is rotated by the zoom actuator 31, the outside cam barrel 34 moves in the optical axis direction along the cam grooves 22a while rotating with respect to the fixed barrel 22.

Two or more bayonet claws (not shown) that engage with circumference grooves 34b formed in the inner periphery of the outside cam barrel 34 are provided in the outer periphery of the outside rectilinear barrel 35 in the circumferential direction. Moreover, the outer periphery of the outside rectilinear barrel 35 is provided with rectilinear keys (not shown) that engages with rectilinear key grooves 22b of the fixed barrel 22. When the outside cam barrel 34 is rotated by the zoom actuator 31, the outside rectilinear barrel 35 moves rectilinearly in the optical axis direction along the rectilinear key groove 22b together with the outside cam barrel 34 without rotating.

The outer periphery of the inside cam barrel 20 is provided with three followers 20f, three engagement parts 20g, and three drive keys 20h (see FIG. 20 and FIG. 21) at nearly regular intervals in the circumferential direction, respectively. The inside cam barrel 20 rotates around the optical axis in the same phase of the outside cam barrel 32 because the drive keys 20h engage with three key grooves (not shown) provided in the inner periphery of the outside cam barrel 34. Moreover, the inside cam barrel 20 moves in the optical axis direction while rotating with respect to the outside rectilinear barrel 35, because the followers 20f engage with cam grooves (not shown) formed in the inner periphery of the outside rectilinear barrel 35.

The inside cam cover 33 is provided with three engagement claws (not shown) that engage with the engagement parts 20g of the inside cam barrel 20 and three detent parts that fit in the drive keys 20h of the inside cam barrel 20, and moves in the optical axis direction while rotating together with the inside cam barrel 20.

A flange 21g is formed on the subject side of the inside rectilinear barrel 21 arranged inside the inside cam barrel 20 (see FIG. 19 through FIG. 22), and a linear sliding plate 19 is attached to the inside rectilinear barrel 21 at the side of the image pickup device 30. The inside rectilinear barrel 21 holds the inside cam barrel 20 between the flange 21g and the linear sliding plate 19 in the optical axis direction. On the other hand, rectilinear keys 19a (see FIG. 20 and FIG. 21) that engage with rectilinear key grooves 35a provided in the inner periphery of the outside rectilinear barrel 35 is provided in the linear sliding plate 19, which regulates the rotation of the linear sliding plate 19. Accordingly, when the inside cam barrel 20 moves in the optical axis direction while rotating, the inside rectilinear barrel 21 moves rectilinearly in the optical axis direction together with the inside cam barrel 20 without rotating.

Moreover, a first group guide key 21b, a second group guide groove (not shown), and a third group guide groove are provided in the inside rectilinear barrel 21.

Six first group followers (not shown) are provided in the inner periphery of the first group barrel 24, which holds the first group lens 23, in the circumferential direction at nearly regular intervals. A rectilinear key groove (not shown) is also formed in the inner periphery of the first group barrel 24. Six first group followers engage with six first group cam grooves 20d that are provided in the outer periphery of the inside cam barrel 20, respectively. The first group guide key 21b of the inside rectilinear barrel 21 engages with the rectilinear key groove. Accordingly, when the inside cam barrel 20 moves in the optical axis direction while rotating, the first group barrel 24 moves rectilinearly in the optical axis direction with respect to the inside cam barrel 20 without rotating.

Three second group followers (not shown) are provided in the outer periphery of the second group holder 26, which holds the second group lens 25, in the circumferential direction at nearly regular intervals. A rectilinear key (not shown) is also formed in the outer periphery of the second group holder 26. The three second group followers engage with three second group cam grooves 20c that are provided in the inner periphery of the inside cam barrel 20, respectively. The rectilinear key engages with a second group guide groove (not shown) of the inside rectilinear barrel 21. Accordingly, when the inside cam barrel 20 moves in the optical axis direction while rotating, the second group holder 26 moves rectilinearly in the optical axis direction with respect to the inside cam barrel 20 without rotating.

The second group holder 26 has a shielding flanges 26b between the second group followers (not shown) and the second group lens 25. The shielding flange 26b shades the imaging plane from the light that passes through the space between the outer periphery of the second group lens 25 and the inner periphery of the inside rectilinear barrel 21 from the subject side in the optical axis direction.

The outer periphery of the third group base plate 9 that holds the third group lens 2 provides three followers 9e. A rectilinear key (not shown) is also formed in the outer periphery of the first group barrel 9. The three followers 9e engage with three cam grooves 20a formed in the inner periphery of the inside cam barrel 20, respectively, and the rectilinear key engages with a guide groove 21d of the inside rectilinear barrel 21. Accordingly, when the inside cam barrel 20 moves in the optical axis direction while rotating, the third group base plate 9 moves rectilinearly in the optical axis direction with respect to the inside cam barrel 20 without rotating.

The fourth group holder 28 that holds the fourth group lens 27 is supported by the fixed barrel 22 and a sensor-holder 29. A focal actuator (not shown) provided on the sensor holder 29 performs focusing operations by moving the fourth group holder 28 holding the fourth group lens 27 forwardly and backwardly in the optical axis direction with respect to the outside rectilinear barrel 35.

Figure 5:
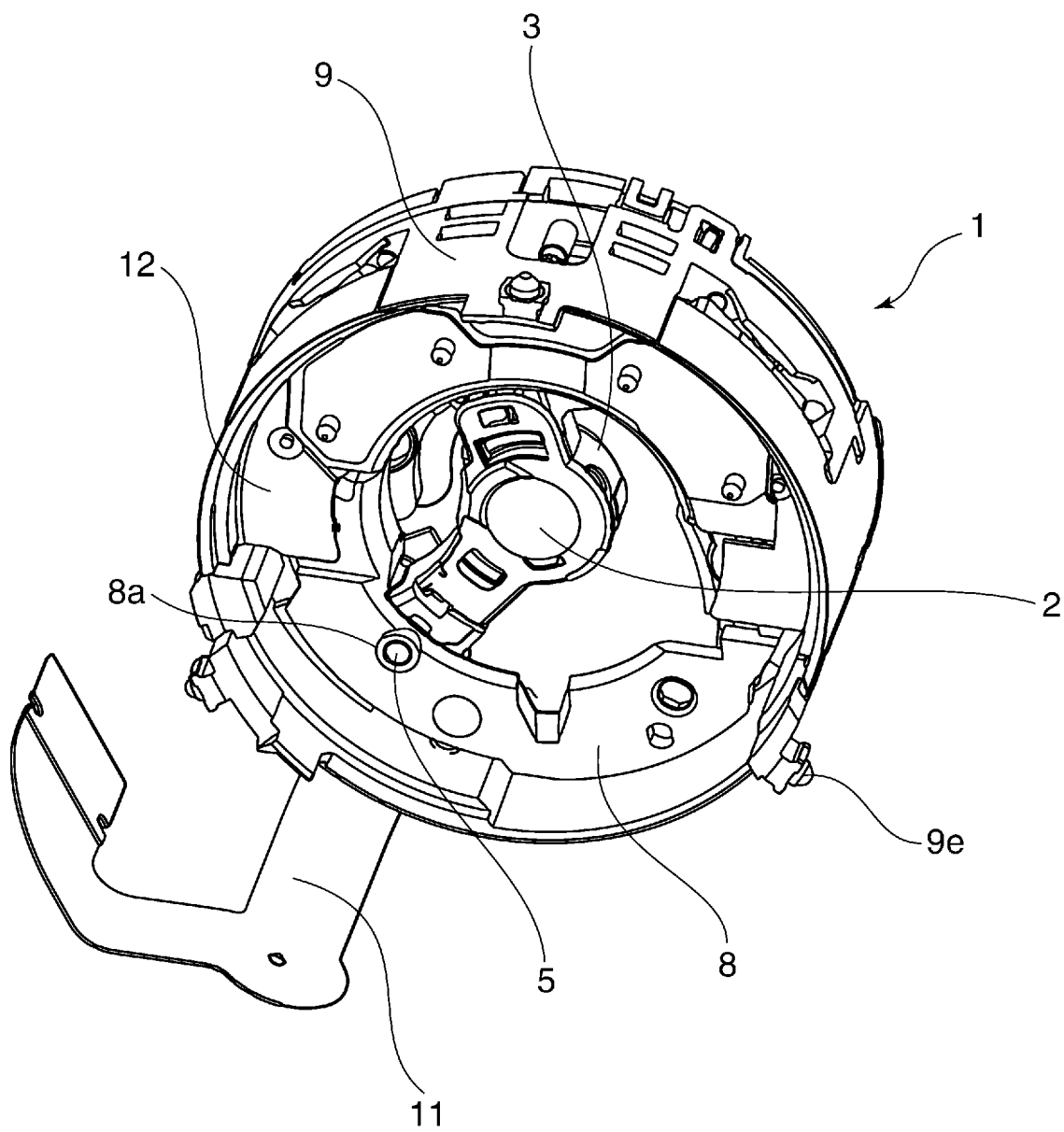
FIG. 5 is a perspective view showing an image stabilization device included in the lens barrel shown in FIG. 2 viewed from a front side.
Figure 6:
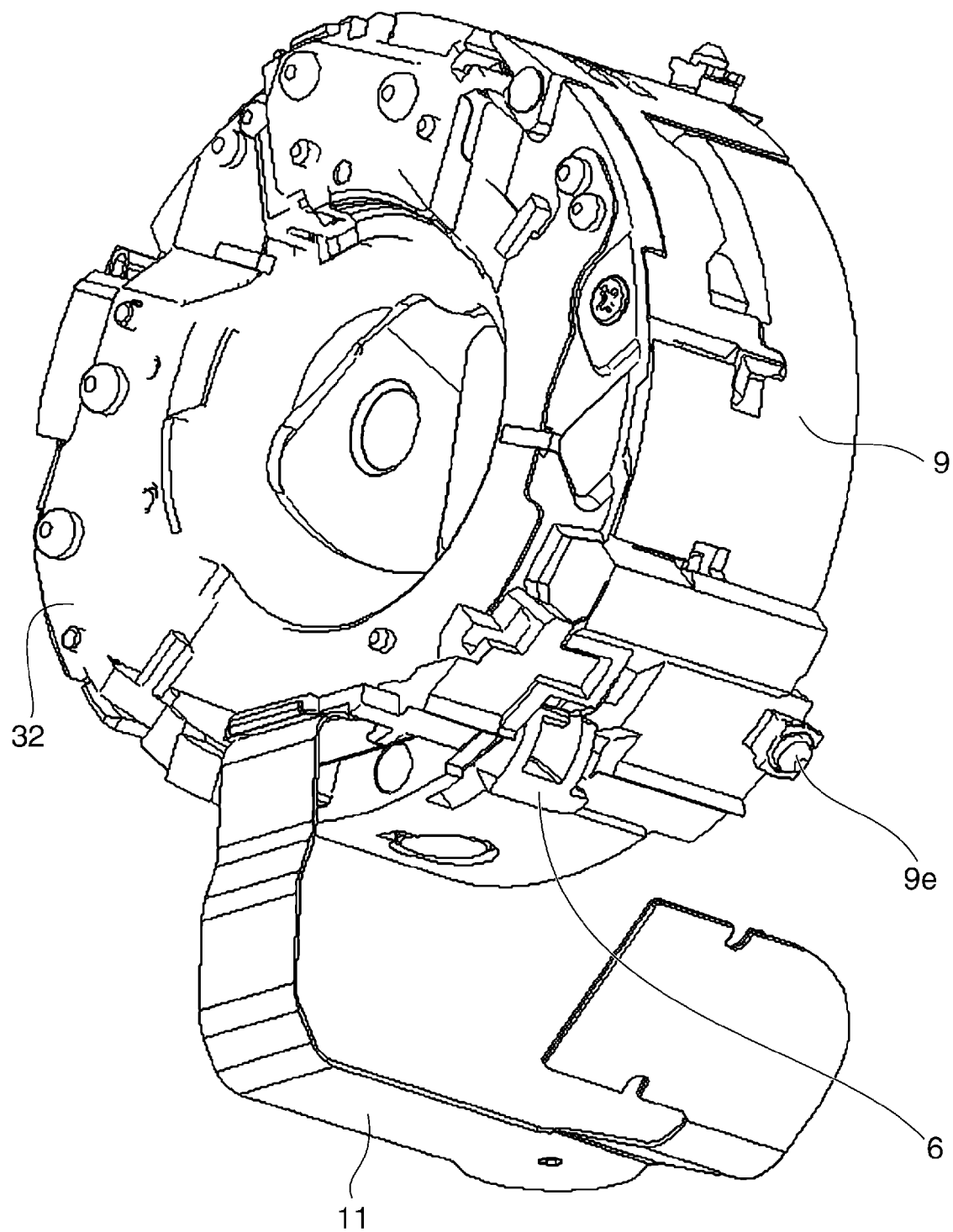
FIG. 6 is a perspective view showing the image stabilization device shown in FIG. 5 viewed from a rear side.
Figure 7:
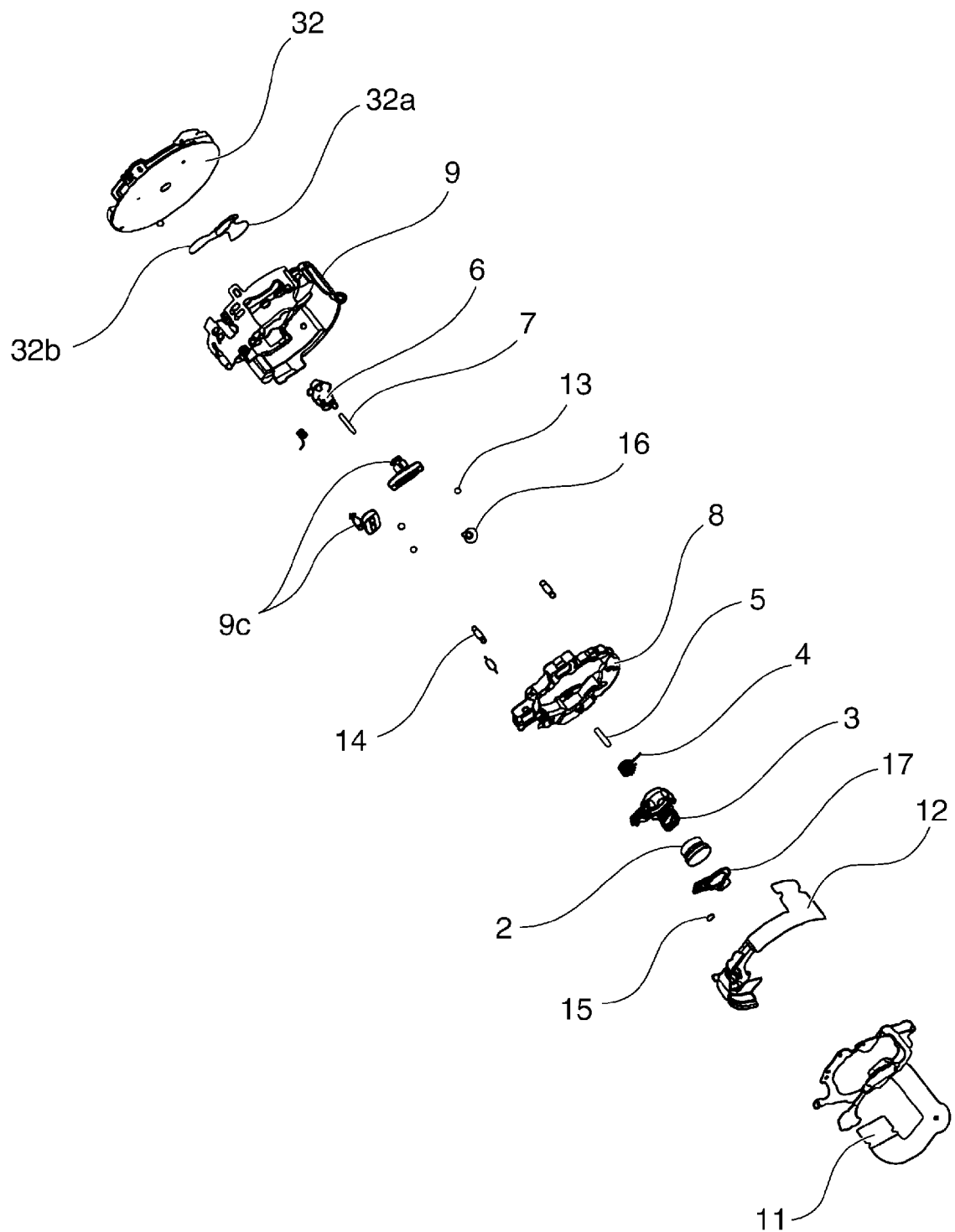
FIG. 7 is an exploded perspective view showing the image stabilization device shown in FIG. 5 viewed from the front side.
Figure 8:
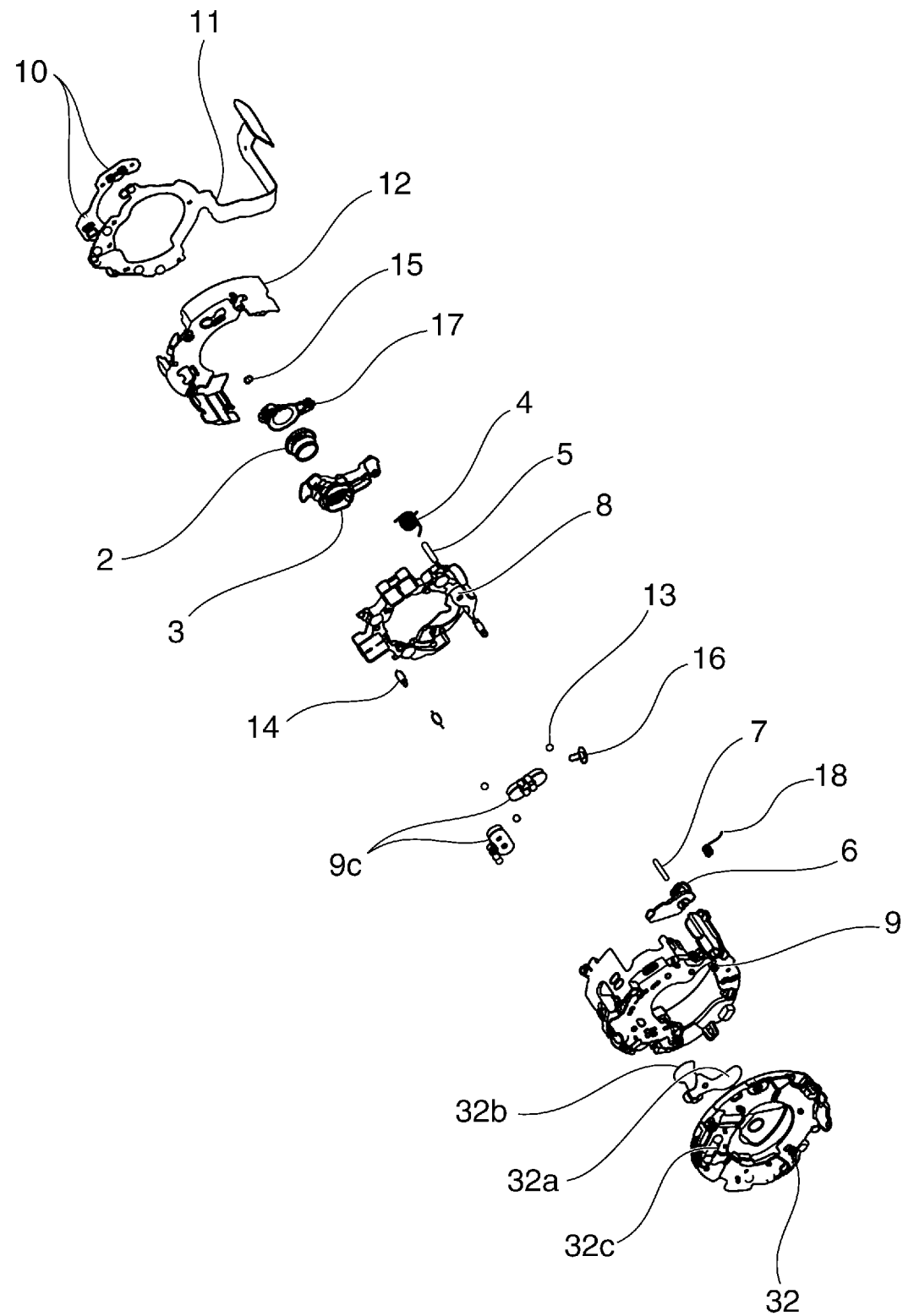
FIG. 8 is an exploded perspective view showing the image stabilization device shown in FIG. 5 viewed from the rear side.

Next, the image stabilization device 1 using the third group lens 2 will be described in detail with reference to FIG. 5 through FIG. 26. FIG. 5 is a perspective view showing the image stabilization device 1 included in the lens barrel 100 shown in FIG. 2 viewed from a front side (a subject side). FIG. 6 is a perspective view showing the image stabilization device 1 viewed from a rear side (the side of the image pickup device 30). FIG. 7 is an exploded perspective view showing the image stabilization device 1 viewed from the front side. FIG. 8 is an exploded perspective view showing the image stabilization device 1 viewed from the rear side.

Figure 9:
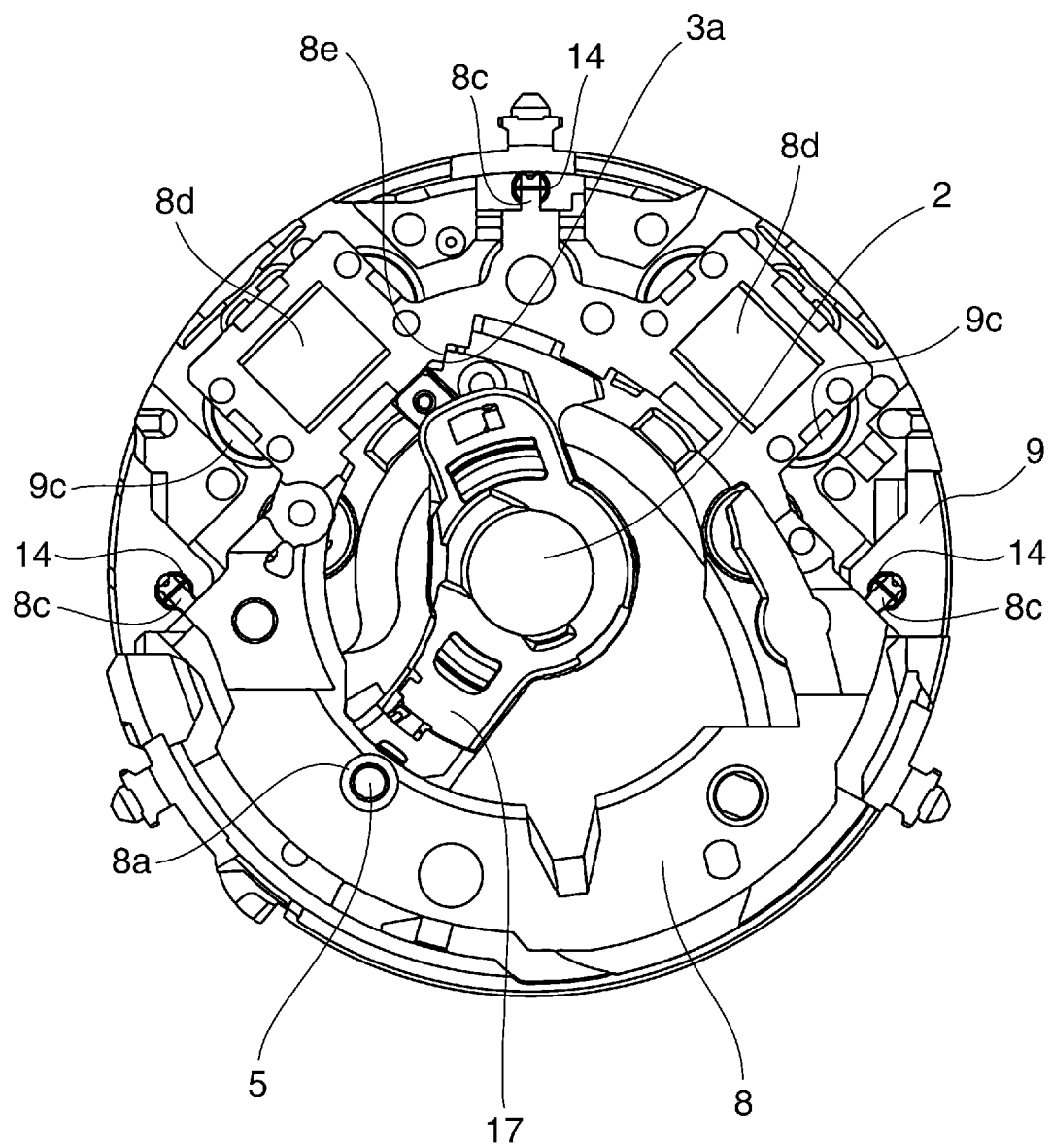
FIG. 9 is a view showing the image stabilization device shown in FIG. 5 viewed from the front side in an optical axis direction when a third group holder is located at an entering position.
Figure 10:
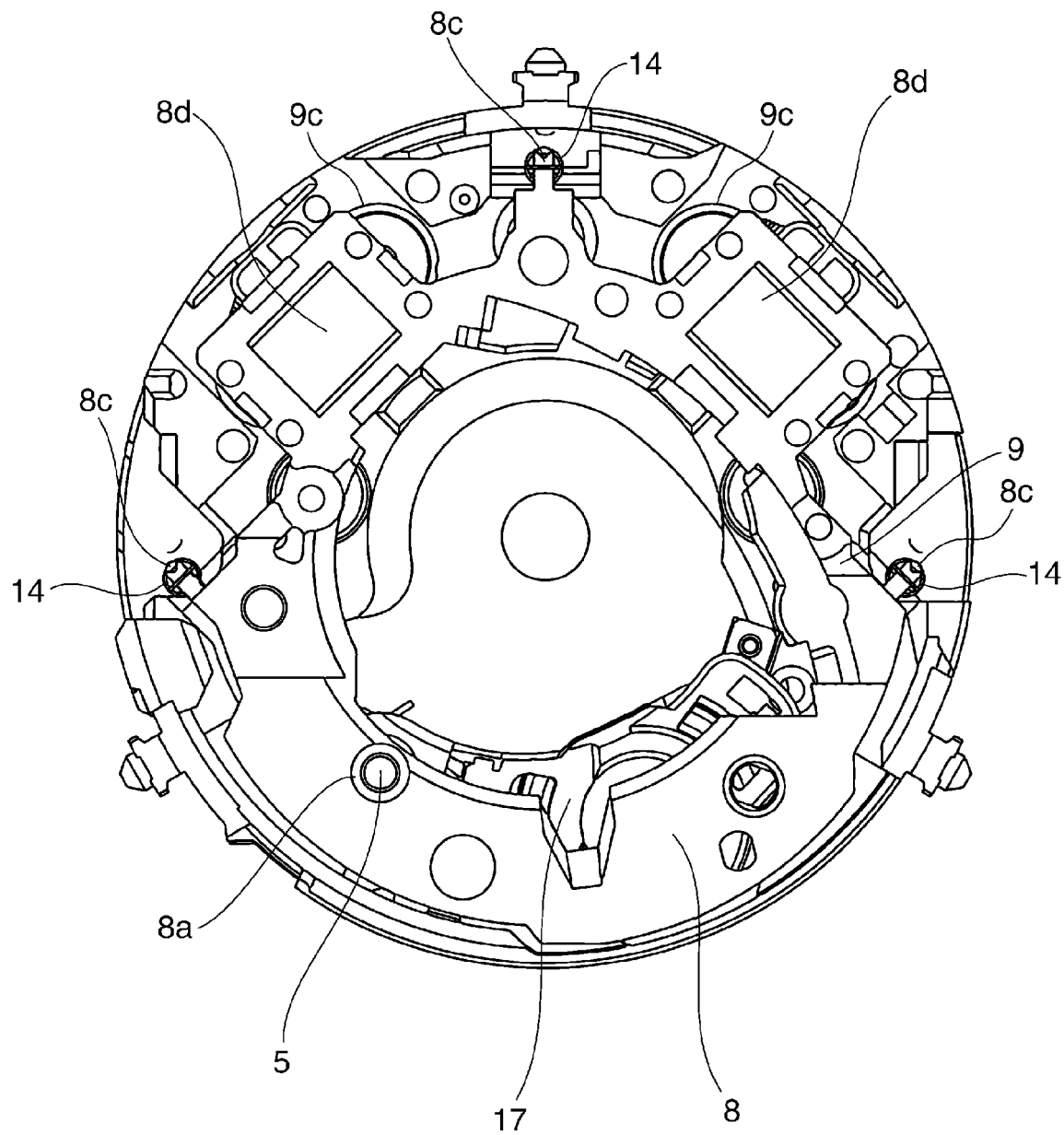
FIG. 10 is a view showing the image stabilization device shown in FIG. 5 viewed from the front side in the optical axis direction when the third group holder is located at a retracted position.
Figure 11:
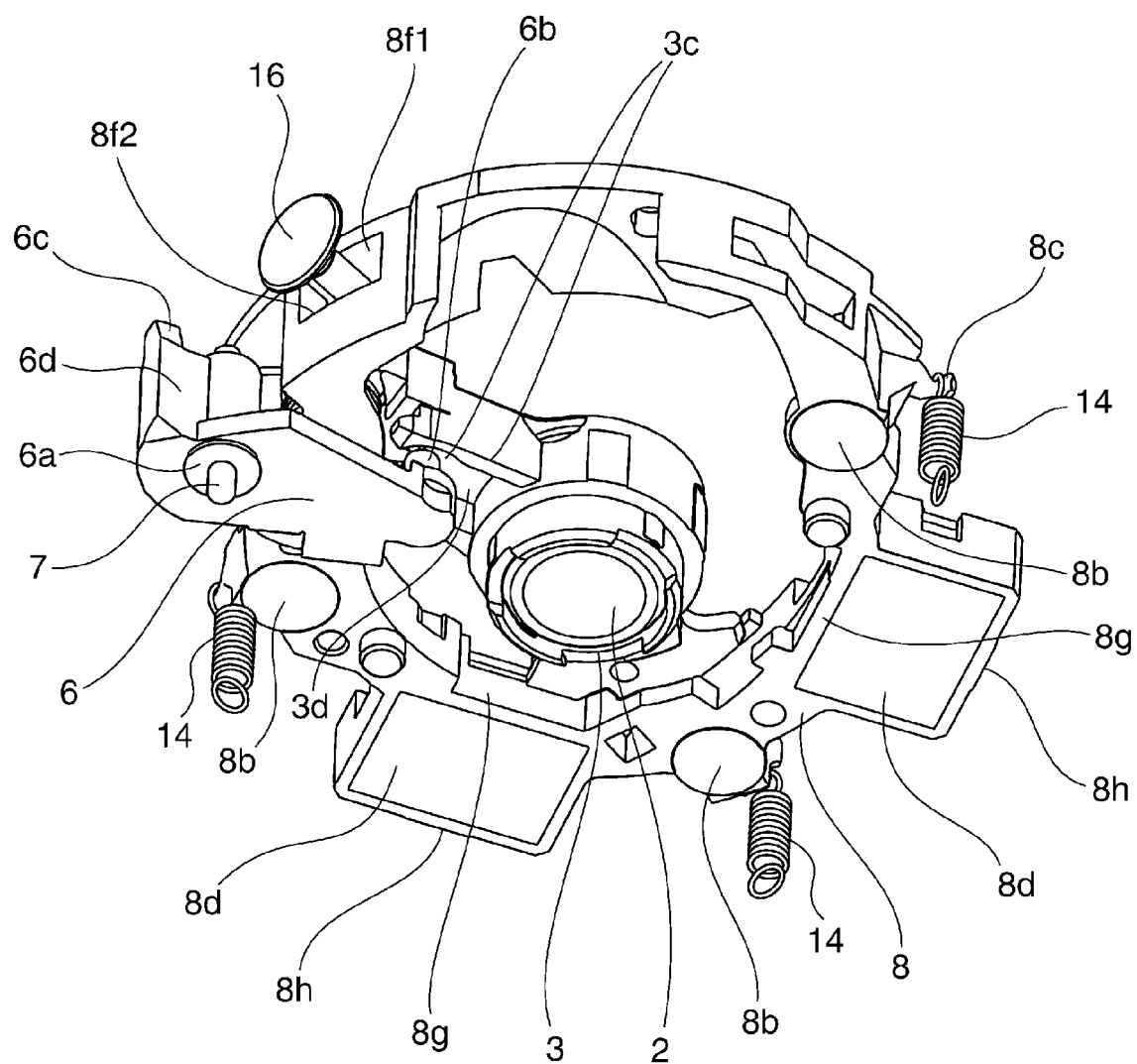
FIG. 11 is a perspective view showing a relationship between the third group holder and a third group lever that are included in the lens barrel shown in the FIG. 2 at the entering position.
Figure 12:
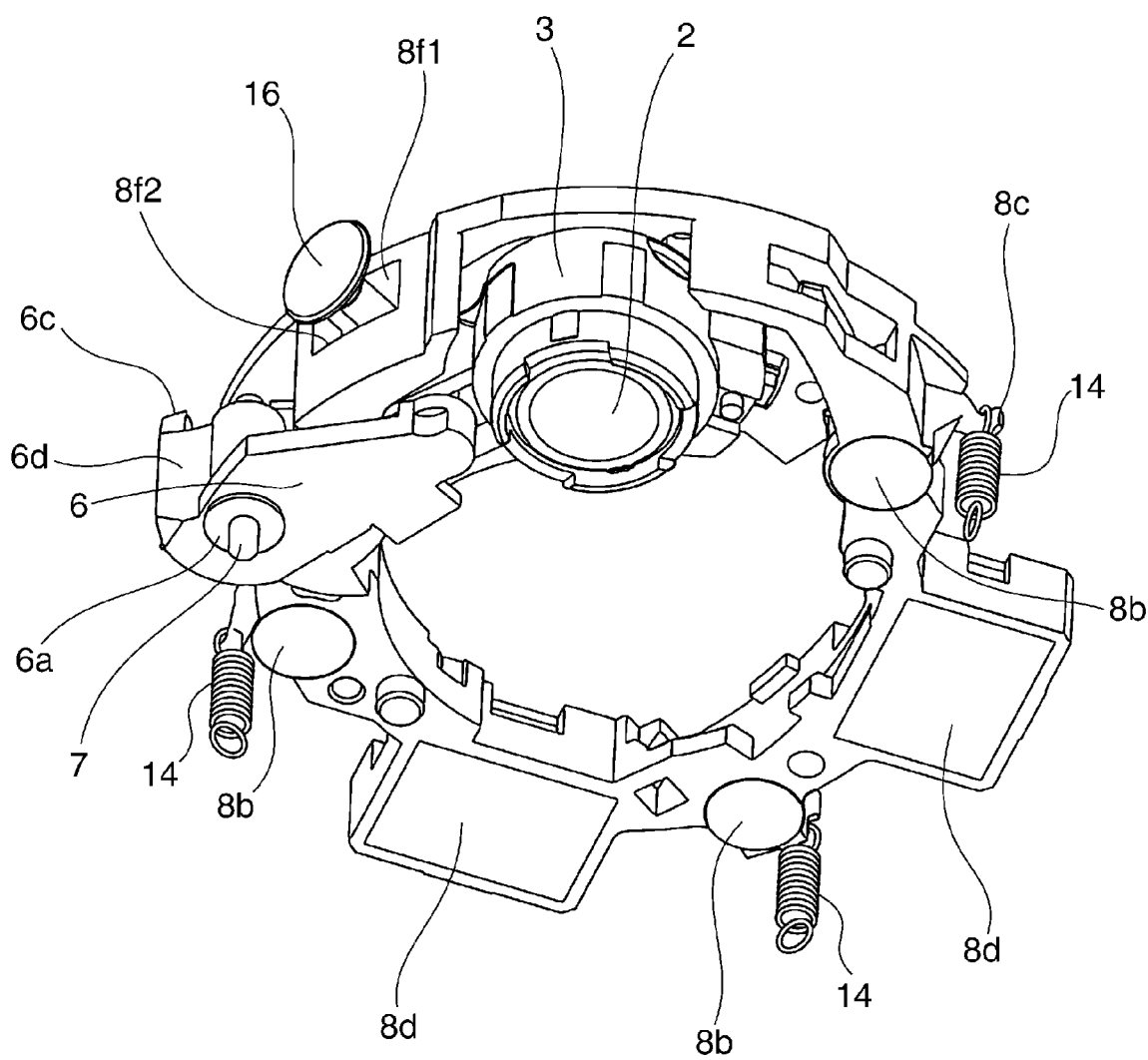
FIG. 12 is a perspective view showing the relationship between the third group holder and the third group lever shown in FIG. 11 at the retracted position.

FIG. 9 is a view showing the image stabilization device 1 viewed from the front side in the optical axis direction when the third group holder 3 is located at an entering position. FIG. 10 is a view showing the image stabilization device 1 viewed from the front side in the optical axis direction when the third group holder 3 is located at a retracted position. FIG. 11 is a perspective view showing a relationship between the third group holder 3 and the third group lever 6 at the entering position. FIG. 12 is a perspective view showing the relationship between the third group holder 3 and the third group lever 6 at the retracted position.

Figure 13:
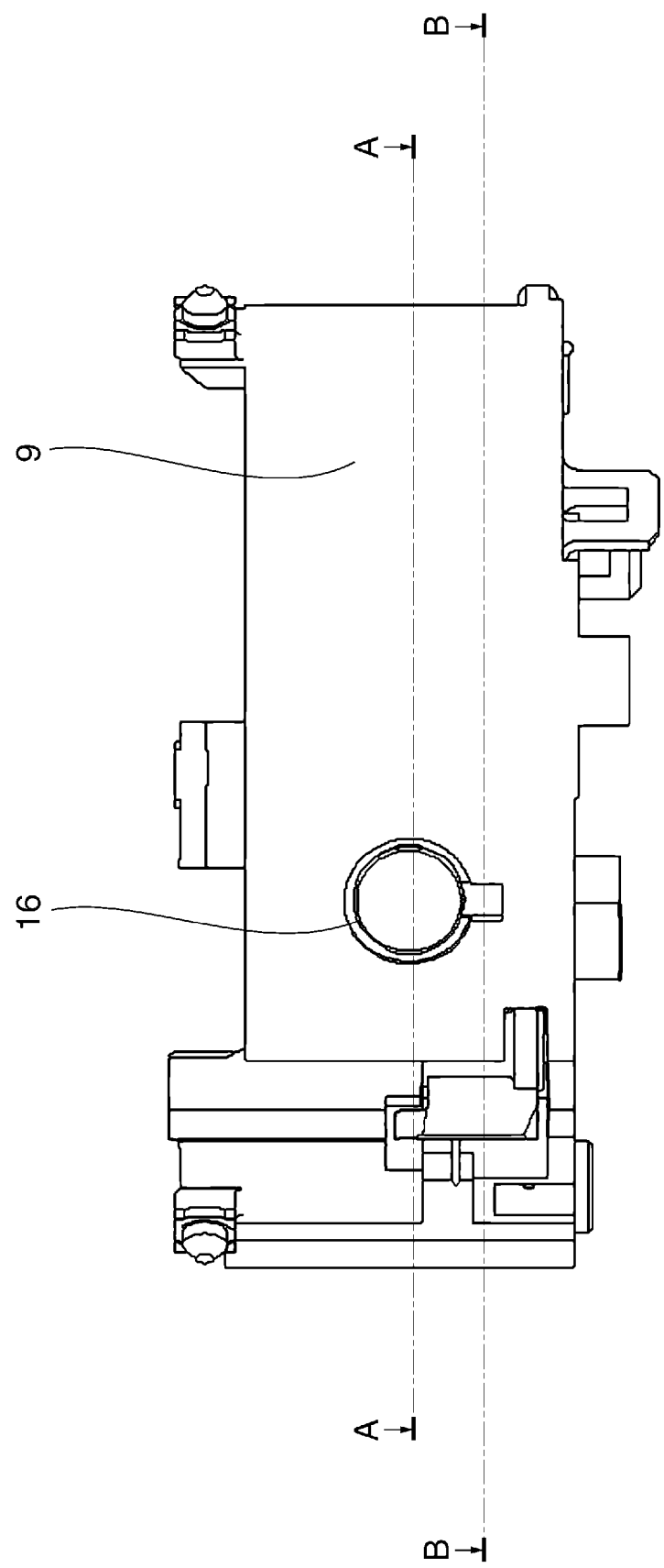
FIG. 13 is a view showing the image stabilization device shown in FIG. 5 viewed from a lower side.
Figure 14:
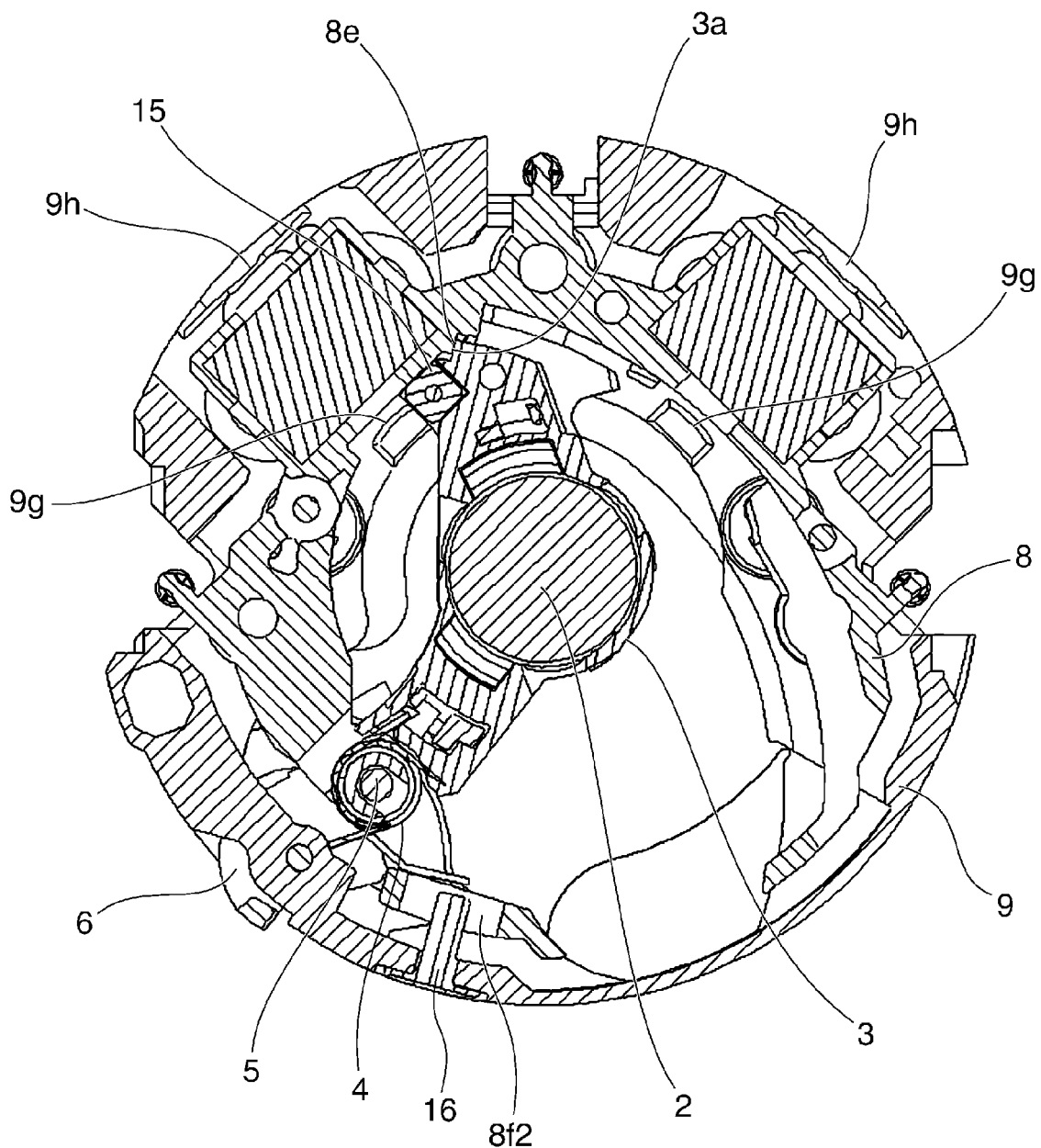
FIG. 14 is a sectional view along line A-A of FIG. 13 showing the relationship between the third group holder and the third group lever at the entering position.
Figure 15:
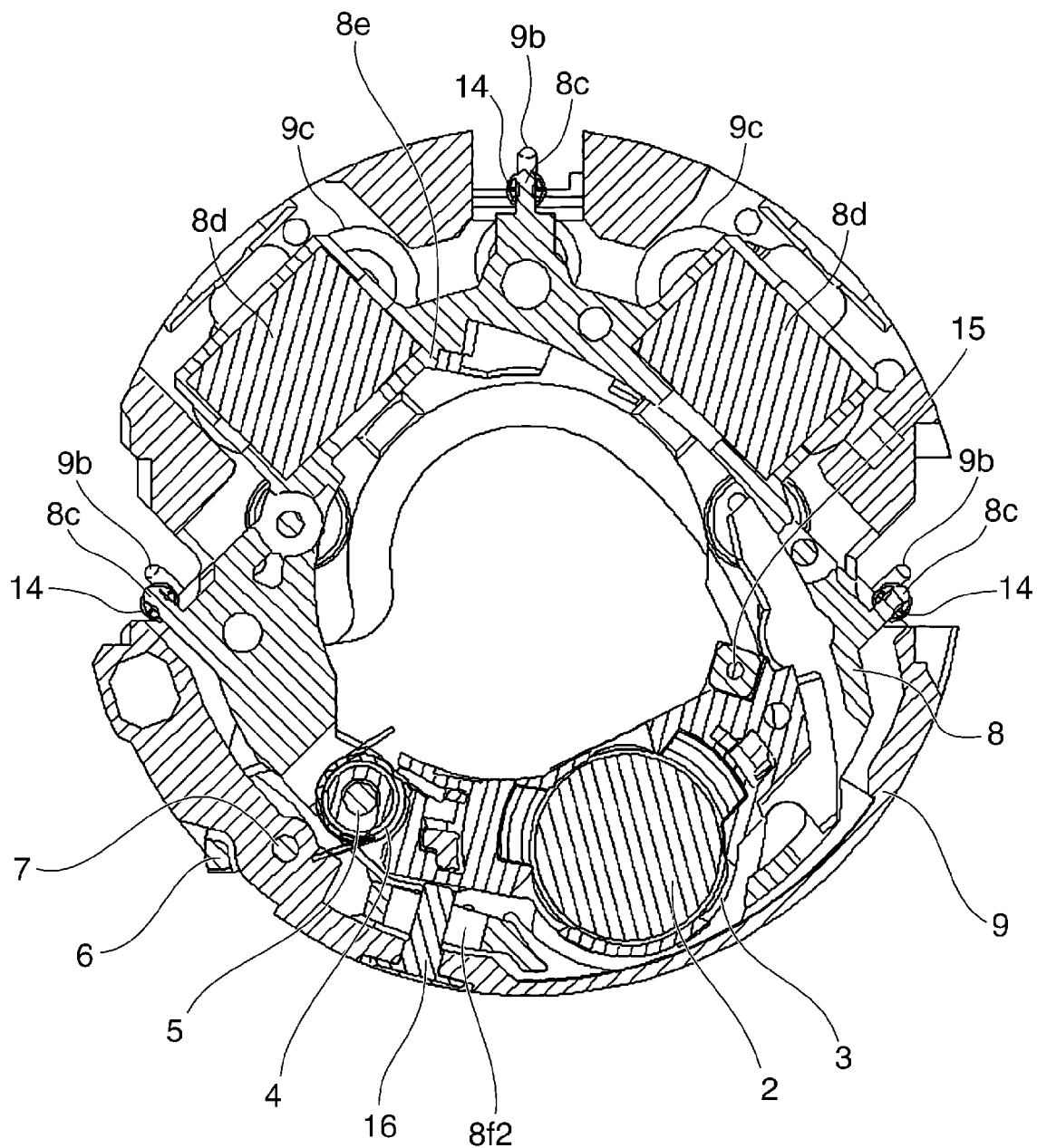
FIG. 15 is a sectional view along line A-A of FIG. 13 showing the relationship between the third group holder and the third group lever at the retracted position.

FIG. 13 is a view showing the image stabilization device 1 viewed from a lower side. FIG. 14 is a sectional view along line A-A of FIG. 13 showing the relationship between the third group holder 3 and the third group lever 6 at the entering position. FIG. 15 is a sectional view along line A-A of FIG. 13 showing the relationship between the third group holder 3 and the third group lever 6 at the retracted position.

Figure 16:
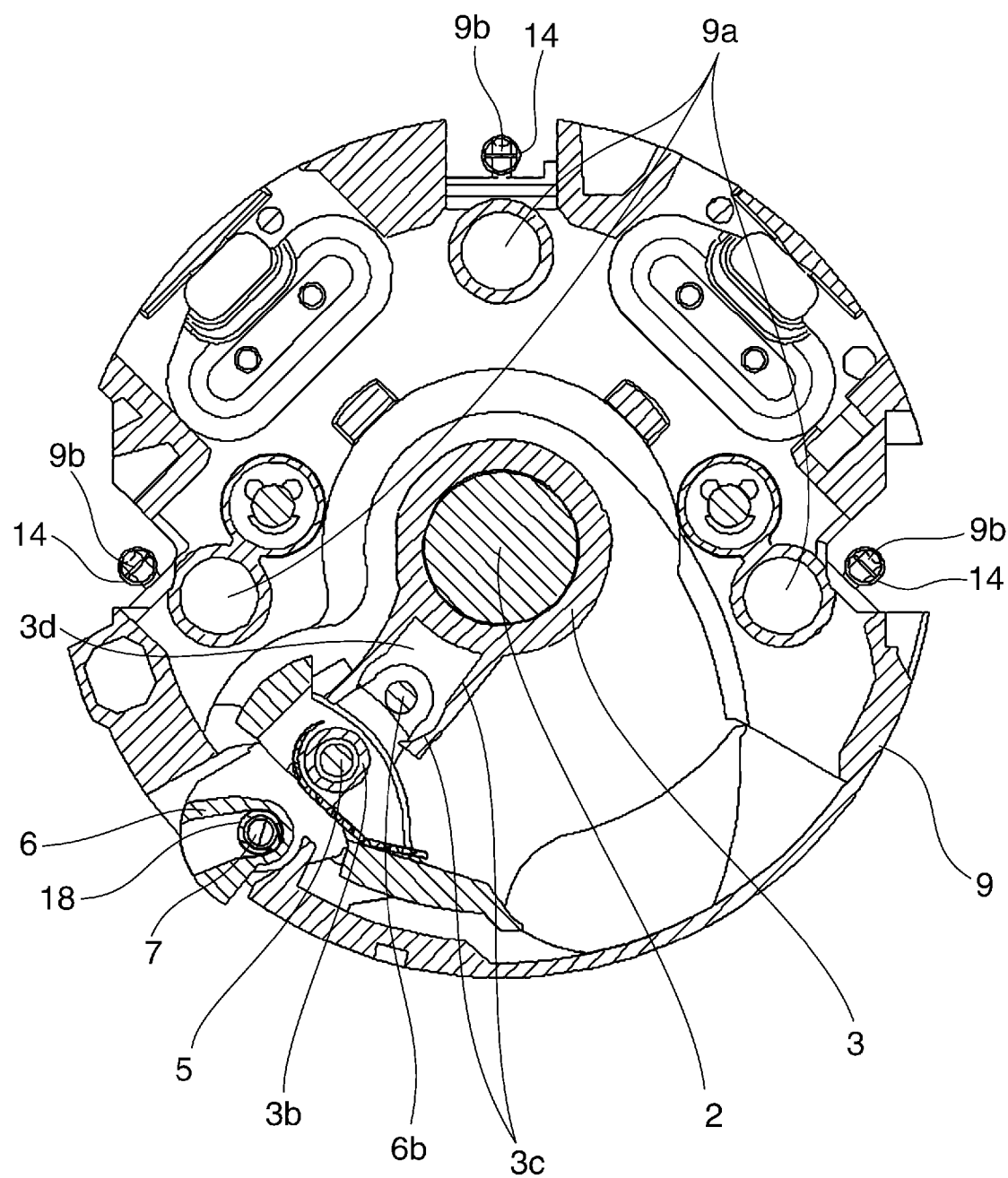
FIG. 16 is a sectional view along line B-B of FIG. 13 showing the relationship between the third group holder and the third group lever at the entering position.
Figure 17:
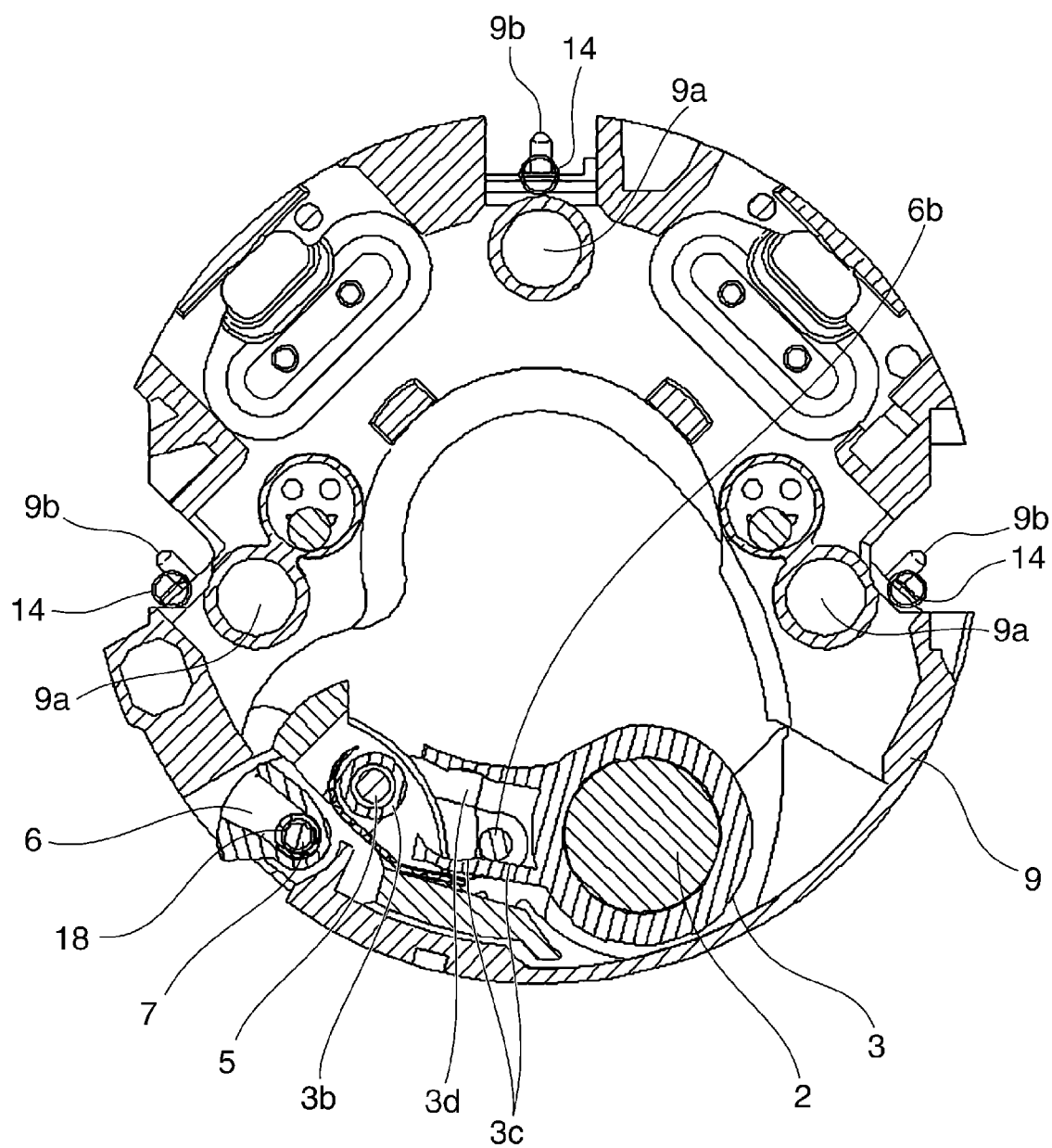
FIG. 17 is a sectional view along line B-B of FIG. 13 showing the relationship between the third group holder and the third group lever at the retracted position.
Figure 18:
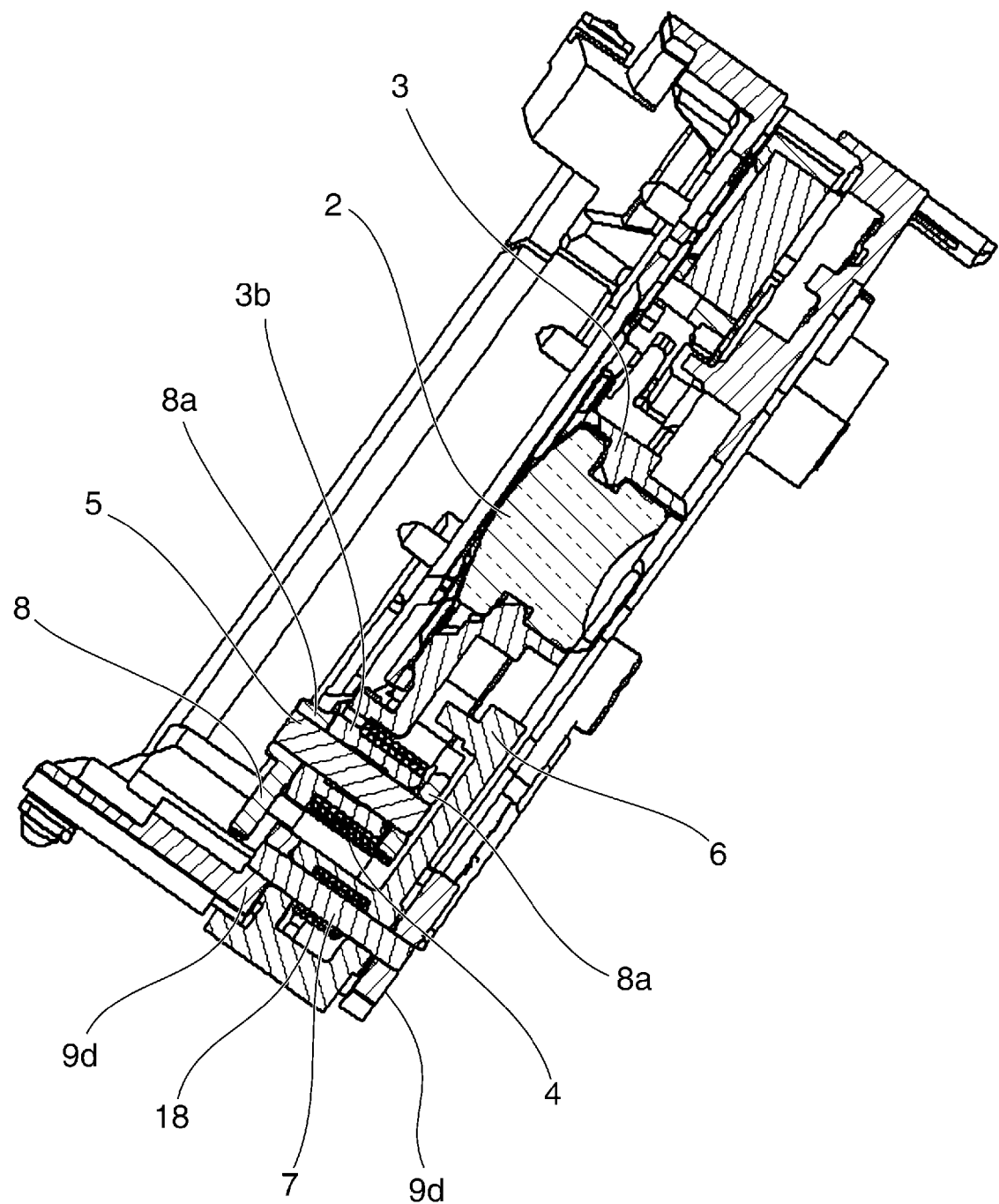
FIG. 18 is a sectional view along line A-A of FIG. 13 showing the relationship between the third group holder and the third group lever at the entering position.

FIG. 16 is a sectional view along line B-B of FIG. 13 showing the relationship between the third group holder 3 and the third group lever 6 at the entering position. FIG. 17 is a sectional view along line B-B of FIG. 13 showing the relationship between the third group holder 3 and the third group lever 6 at the retracted position. FIG. 18 is a sectional view showing the relationship between the third group holder 3 and the third group lever 6 at the entering position.

Figure 19:
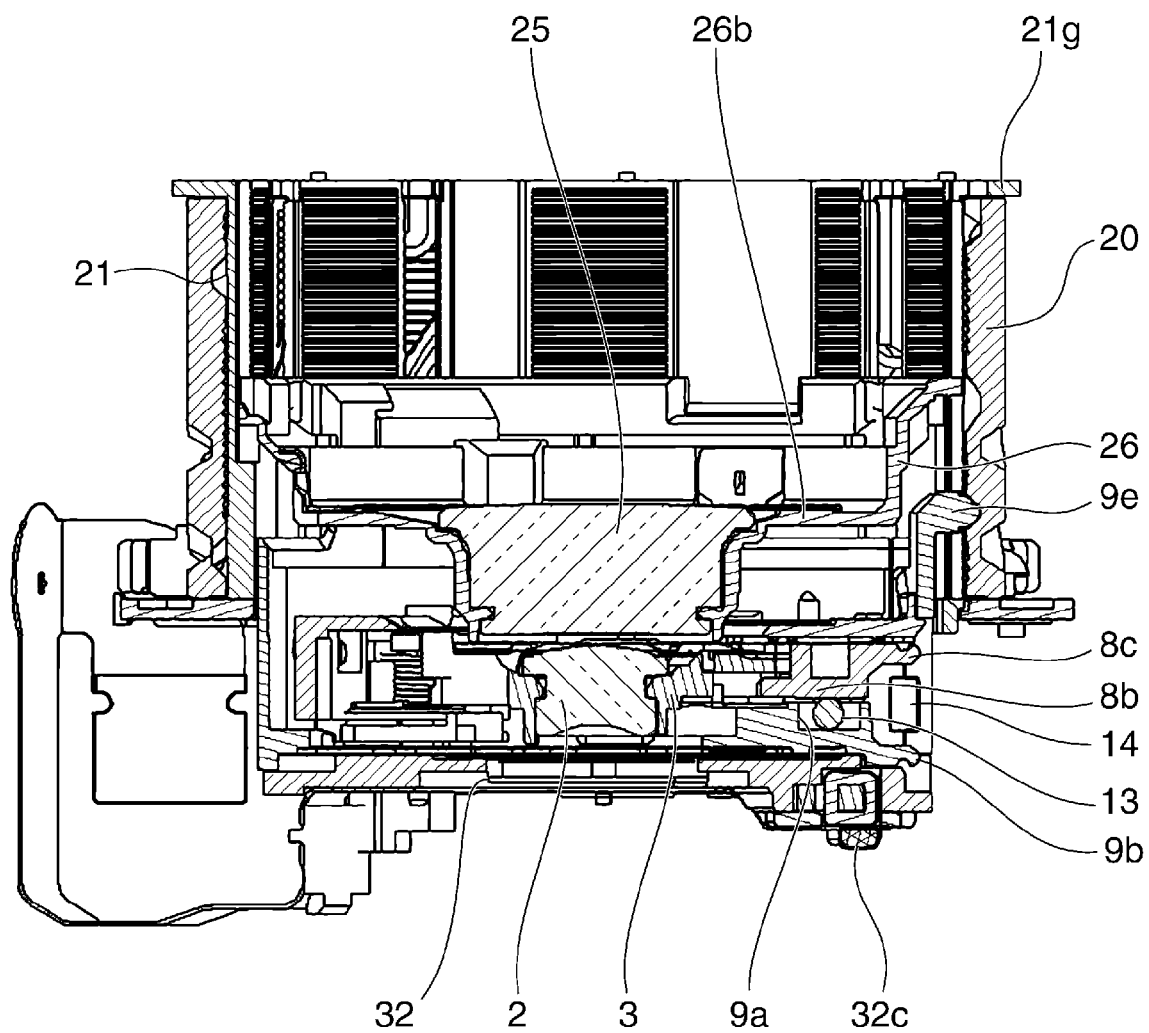
FIG. 19 is a sectional view showing the image stabilization device shown in FIG. 5 when the lens barrel is in the shooting state.

FIG. 19 is a sectional view showing the image stabilization device 1 when the lens barrel 100 is in the shooting state.

As shown in FIG. 5 through FIG. 8, the image stabilization device 1 has the third group lens 2, the third group holder 3, the third group frame 8, the third group base plate 9, the third group lever 6, a third group mask 17, and a third group flexible substrate 11. The third group holder 3 holds the third group lens 2 and is rotatable about a holder shaft 5. The third group holder 3 is movably attached to the third group frame 8 so as to allow the movement of the third group lens 2 between the entering position where the third group lens 2 enters into the optical path and the retracted position where the third group lens 2 is retracted from the optical path. The third group frame 8 is movably attached to the third group base plate 9. The third group lever 6 engages with the third group holder 3 and drives the third group holder 3 between the entering position and the retracted position. The third group mask 17 is attached to the subject side of the third group holder 3. The image stabilization device 1 and the control unit in the camera body 101 exchanges signals through the third group flexible substrate 11.

A pair of Hall devices 10 are connected to the third group flexible substrate 11, and are arranged on a Hall sensor holder 12 fixed to the third group base plate 9. A pair of coils 9c are fixed to the third group base plate 9. Moreover, the third-group-base-plate pin 16 that regulates the movement of the third group frame 8 with respect to the third group base plate 9 is also fixed to the third group base plate 9. A sub yoke 15 is attached to the third group holder 3.

The third group lens 2 is equivalent to an example of the optical element of the invention, and constitutes the correction lens of the image stabilization device 1. Moreover, the third group holder 3 is equivalent to an example of the holding member of the invention, and the third group lever 6 is equivalent to an example of the driving member of the invention.

Moreover, the third group base plate 9 is equivalent to an example of the second member of the invention, the third group frame 8 is equivalent to an example of the first member of the invention, and the third-group-base-plate pin 16 is equivalent to an example of the regulation member of the invention.

The third group holder 3 holds the third group lens 2, and is fixed to the holder shaft 5, which is parallel to the optical axis and is press-fitted in a sleeve 3b. The holder shaft 5 is rotatably supported by a pair of bearings 8a (see FIG. 23) of the third group frame 8 so that the third group holder is rotatable between the entering position and the retracted position. The third group holder 3 moves in the direction intersecting the optical axis direction together with the third group frame 8 with respect to the third group base plate 9 at the time of image-blur correction. A holder torsion spring 4 is fitted around the sleeve 3b (see FIG. 23), and energizes the third group holder 3 with respect to the third group frame 8 from the retracted position towards the entering position where a stopper 3a of the third group holder 3 contacts a contact surface 8e (see FIG. 9) of the third group frame 8. As shown in FIG. 11, a retraction contact part 3c as a wall-like section is provided in the arm section of the third group holder 3 at the side of the third-group-base-plate pin 16, and a similar wall-like section is provided at the other side. Then, an interference avoiding space 3d is formed between the wall-like sections at the both sides.

The third group lever 6 is fixed to a third group lever shaft 7 that is rotatably supported by a pair of bearings 9d of the third group base plate 9. A lever torsion spring 18 energizes the third group lever 6 in the direction that the third group lens 2 moves to the entering position (see FIG. 18 and FIG. 23). A fitting section 6a into which the third group lever shaft 7 is fitted, a retraction contact pin 6b that is located in the interference avoiding space 3d of the third group holder 3 and contacts the retraction contact part 3c at the time of retraction, a retraction slant face 6c that contacts a retraction introduction face 21e of the inside rectilinear barrel 21, and a retraction completion face 6d that contacts a retraction completion face 21f of the inside rectilinear barrel 21 are provided in the third group lever 6 (see FIG. 11 and FIG. 12).

The shutter unit 32 is attached to the third group base plate 9. The shutter unit 32 includes the pair shutter blades 32a and 32b and a shutter drive unit 32c. The shutter blades 32a and 32b are rotatably supported by the shutter unit 32, and are driven by the shutter drive unit 32c so as to move between a position to obstruct the optical path and a position to be retracted from the optical path in a plane that intersects perpendicularly with the optical axis.

The third group frame 8 and the third group base plate 9 indirectly contact with each other through three balls 13 and are elastically connected by three thrust springs 14 (see FIG. 19). That is, the third group frame 8 is provided with three ball-receiving parts 8b that contact the balls 13 and three spring hooks 8c to which first ends of the thrust springs 14 are hanged, respectively (see FIG. 9 through FIG. 12). On the other hand, the third group base plate 9 is provided with three ball holes 9a that store the three balls 13, respectively, and three spring hooks 9b to which the second ends of the thrust springs 14 are hanged, respectively (see FIG. 16 and FIG. 17). The third group frame 8 is supported by the third group base plate 9 so as to be movable in the plane that intersects perpendicularly with the optical axis with respect to the third group base plate 9, because the balls 13 are nipped between the ball-receiving parts 8b of the third group frame 8 and the ball holes 9a of the third group base plate 9 with the energization force of the thrust springs 14 (see FIG. 19). Since the third group frame 8 moves using rotations of the balls 13, frictional resistance is reduced and high response is obtained.

Moreover, the third group frame 8 is provided with a pair of magnets 8d that are arranged at positions mutually apart by about 90 degrees in the circumferential direction in the plane that intersects perpendicularly with the optical axis (see FIG. 9 through FIG. 12). On the other hand, the third group base plate 9 is provided with a pair of coils 9c at positions facing the magnets 8d (see FIG. 9, FIG. 14 through FIG. 17).

When electric current is applied to the pair of coils 9c, Lorentz force generated between the magnets 8d and the coils 9c moves the third group frame 8 with respect to the third group base plate 9 in a plane that intersects perpendicularly with the optical axis within a region limited by contacts between mechanical ends 8g and 8h (see FIG. 11) of the third group frame 8 and mechanical ends 9g and 9h (see FIG. 14) of the third group base plate 9.

The control unit (not shown) in the camera body 101 controls voltage applied to the coils 9c on the basis of image-blur information from gyro sensors (not shown) provided in the camera body 101 to move the third group frame 8 in the plane that intersects perpendicularly with the optical axis so as to move the third group holder 3 holding the third group lens 2 in the direction to corrects the image blur. The pair of Hall elements 10 are arranged at positions facing the magnets 8d in the optical axis direction, and detect changes of the magnetic forces from the magnets 8d. The control unit computes a position of the third group frame 8 with respect to the Hall sensor holder 12 on the basis of a detection result, and performs feedback control of the applied voltage. This corrects the image blur of the subject image formed on the image pickup device 30 through the image pickup optical system due to camera shake etc.

As shown in FIG. 11 through FIG. 15, and FIG. 24, the third-group-base-plate pin 16 consists of a circular base plate and a thin pin part that is perpendicularly formed on the center of one surface of the base plate. The third-group-base-plate pin 16 is fixed to the third group base plate 9 by fitting the base plate into a hole with a round cross section formed in the wall of the third group base plate 9. The pin part of the third-group-base-plate pin 16 penetrates the wall of the third group base plate 9, and is inserted into a movable space 8/1 that is secured in the third group frame 8 as a hole with a rectangular section. The movable space 8/1 has a large width in the plane that intersects perpendicularly with the optical axis so that the third-group-base-plate pin 16 does not interfere with the third group frame 8, even when the third group frame 8 moves in the direction perpendicular to the optical axis. On the other hand, the surface of the movable space 8/1 at the side of the imaging plane (the side of the image pickup device 30) is formed as a position-regulating wall 8/2, which contacts with the pin part of the third-group-base-plate pin 16 when the third group frame 8 moves away from the third group base plate 9 in the optical axis direction due to impact etc.

Next, the arrangements of the image stabilization device 1, the first group holder 24a, and the second group holder 26 will be described with reference to FIG. 3. The contour of the imaging plane side of the first group holder 24a is larger than the contour of the subject side of the second group lens 25. Accordingly, the arrangement of the shielding flange 26b of the second group holder 26 at the subject side in the optical axis direction is regulated by the first group holder 24a. Moreover, the arrangement of the image stabilization device 1 at the subject side in the optical axis direction is regulated by the first group holder 24a via the shielding flanges 26b of the second group holder 26.

Next, the relation between the shutter unit 32 and the image stabilization device 1 will be described with reference to FIG. 3, FIG. 7, FIG. 16, and FIG. 17. The shutter blades 32a and 32b provided in the shutter unit 32 pivot in a nearly planar travelling space that intersects perpendicularly with the optical axis to control a light amount.

Moreover, the third group holder 3, the third group lever 6, and the third group frame 8 move within a nearly planar space that intersects perpendicularly with the optical axis for the image stabilization operation and for retracting the third group lens 2, respectively (see FIG. 16 and FIG. 17). Accordingly, if the shutter blades 32a and 32b, the third group holder 3, the third group lever 6, and the third group frame 8 are arranged at overlapped positions in the optical axis direction, the movements thereof are obstructed mutually.

Consequently, the shutter unit 32 is arranged at the position that does not interfere with the third group holder 3, the third group lever 6, and the third group frame 8 at the imaging plane side of the image stabilization device 1 in the optical axis direction. That is, the arrangement of the image stabilization device 1 at the imaging plane side in the optical axis direction is regulated by the travelling space in which the shutter blades 32a and 32b pivot.

In this way, since the arrangement of the image stabilization device 1 at the subject side in the optical axis direction is regulated by the first group holder 24a via the second group holder 26 and the arrangement of the image stabilization device 1 at the imaging plane side in the optical axis direction is regulated by the shutter unit 32, the image stabilization device 1 is arranged in a nearly cylindrical space centering on the optical axis.

Next, operations of the image stabilization device 1 when the lens barrel 100 is collapsed from the shooting state to the collapsed state will be described with reference to FIG. 20 through FIG. 22, etc.

Figure 20:
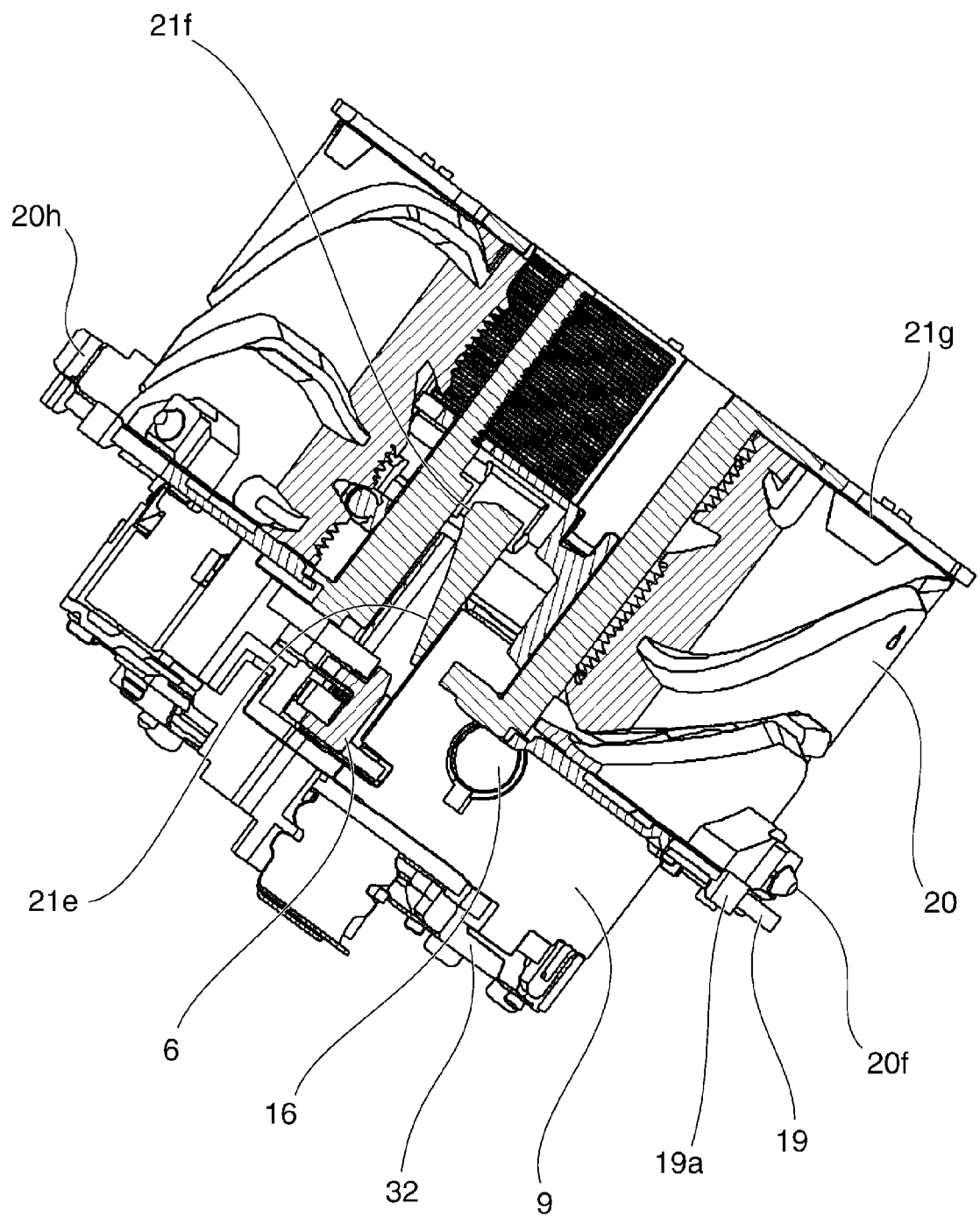
FIG. 20 is a partial sectional view showing the image stabilization device shown in FIG. 5 when the lens barrel is in the shooting state.

FIG. 20 is a sectional view showing the image stabilization device 1 when the lens barrel 100 is in the shooting state. FIG. 21 is a sectional view showing the image stabilization device 1 when the lens barrel 100 is in an intermediate position between the shooting state and the collapsed state. FIG. 22 is a sectional view showing the image stabilization device 1 when the lens barrel 100 is in the collapsed state.

When the lens barrel 100 is in the shooting state as shown in FIG. 20, the third group holder 3 holding the third group lens 2 is arranged at the entering position on the optical axis of the lens barrel 100 as shown in FIG. 9. At this time, the third group lever 6 is held within the interference avoiding space 3d where the retraction contact pin 6b does not contact with the retraction contact part 3c of the third group holder 3, as shown in FIG. 16.

Accordingly, even when the third group holder 3 moves in the plane that intersects perpendicularly with the optical axis together with the third group frame 8 during the image stabilization operation, the retraction contact pin 6b does not contact with the retraction contact part 3c of the third group holder 3, and does not obstruct the movement.

When the lens barrel 100 starts moving from the shooting state to the collapsed state, the inside cam barrel 20 rotates, and the three followers 9e of the outer periphery of the third group base plate 9 move along the cam grooves 20a, which moves the third group base plate 9 in the direction approaching the inside rectilinear barrel 21.

Figure 21:
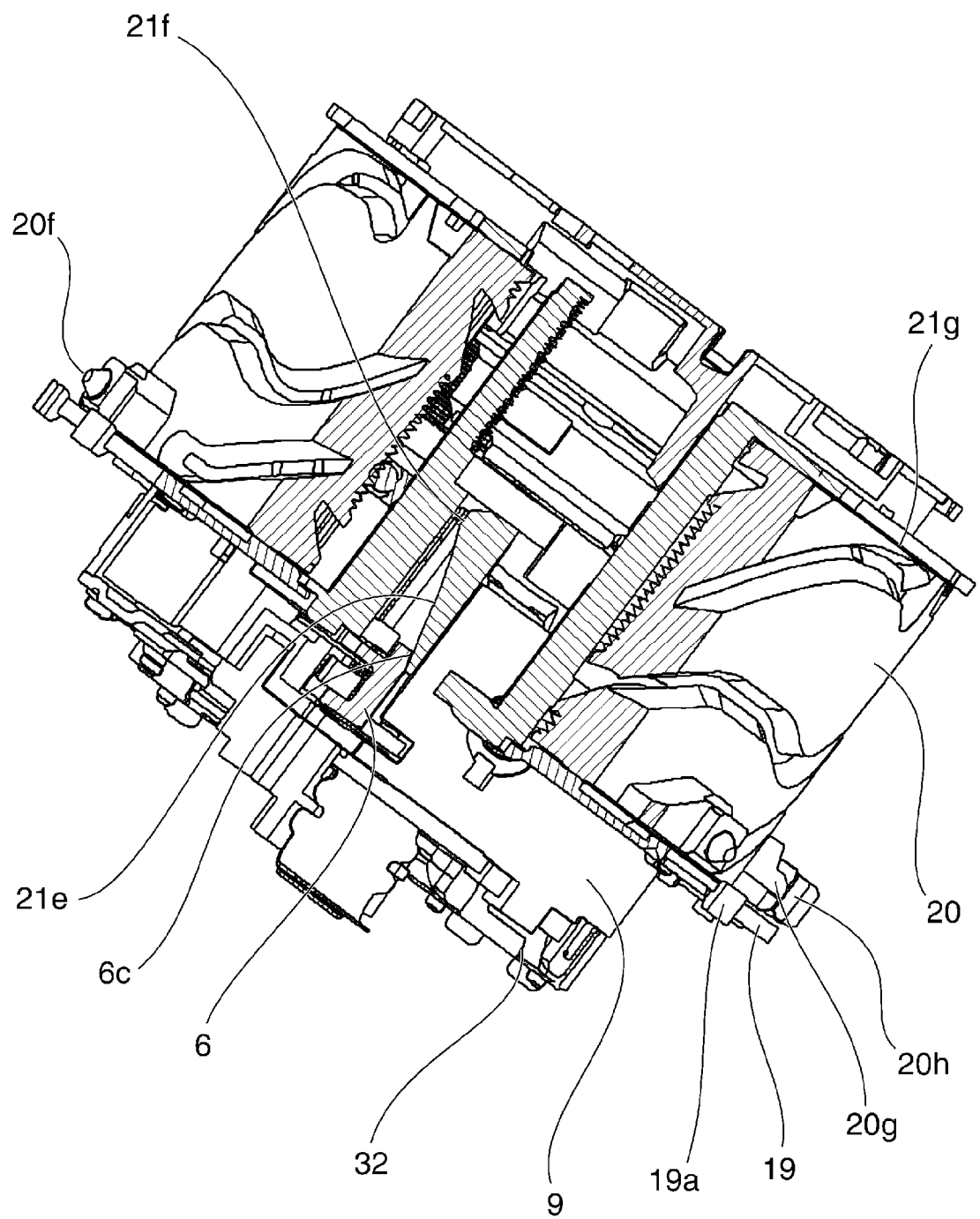
FIG. 21 is a partial sectional view showing the image stabilization device shown in FIG. 5 when the lens barrel is in an intermediate position between the shooting state and the collapsed state.

According to this operation, when the retraction slant face 6c of the third group lever 6 contacts with the retraction introduction face 21e of the inside rectilinear barrel 21 as shown in FIG. 21, the third group lever 6 pivots on the third group lever shaft 7 against the energization force of the lever torsion spring 18. Accordingly, the retraction contact pin 6b contacts with the retraction contact part 3c of the third group holder 3. The rotation of the third group lever 6 moves the third group holder 3 towards the retracted position against the energization force of the holder torsion spring 4.

Figure 22:
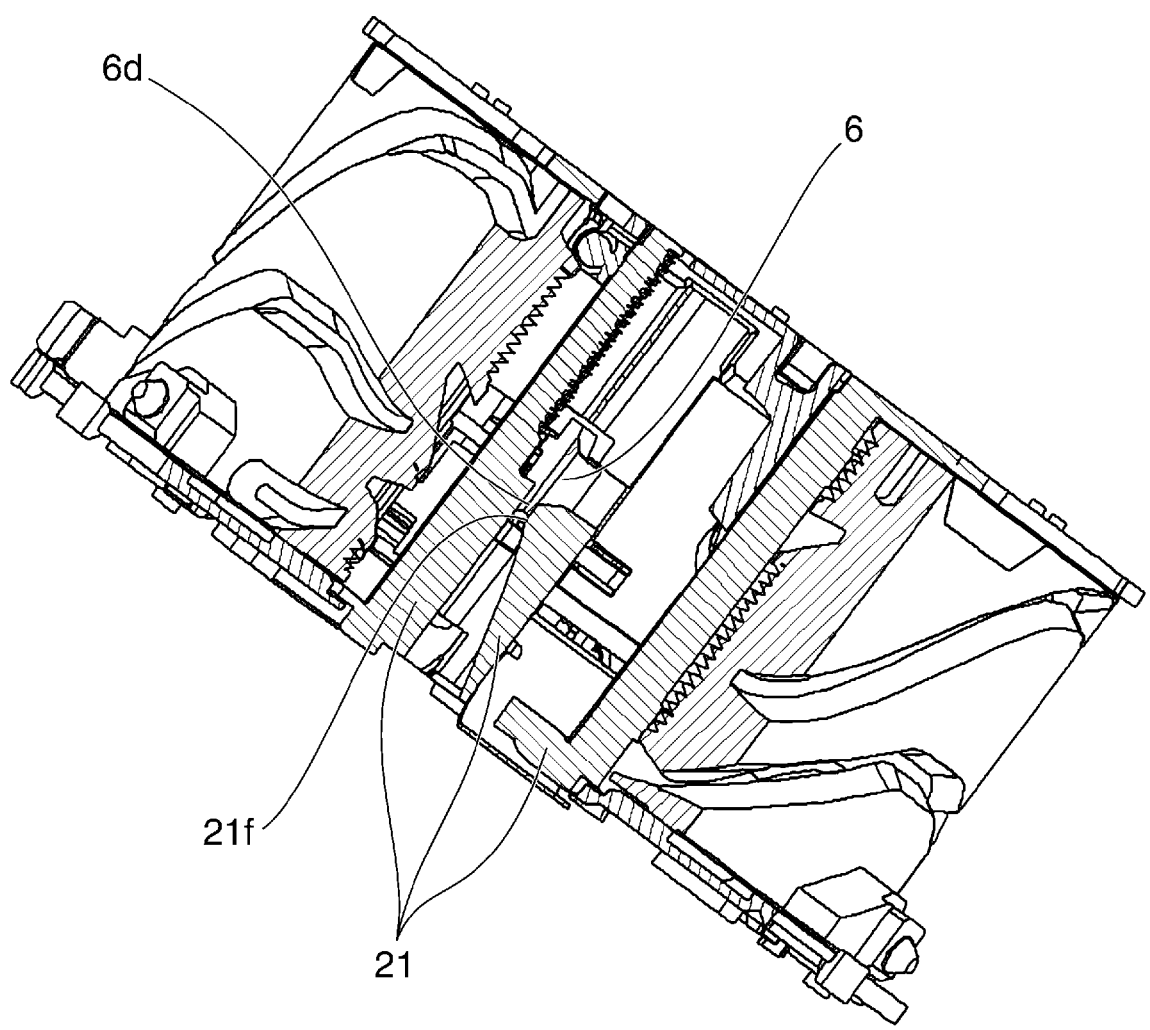
FIG. 22 is a partial sectional view showing the image stabilization device shown in FIG. 5 when the lens barrel is in the collapsed state.

In the collapsed state of the lens barrel 100, the third group base plate 9 moves along the optical axis in the direction approaching the inside rectilinear barrel 21 until the retraction completion face 6d of the third group lever 6 contacts with the retraction completion face 21f of the inside rectilinear barrel 21 as shown in FIG. 22. Accordingly, the third group holder 3 moves to the retracted position as shown in FIG. 17.

Since the third group holder 3 moves to the retracted position away from the optical axis, the second group holder 26 holding the second group lens 25 is stored in the space that the third group holder 3 in the third group frame 8 occupied at the shooting state. This miniaturizes not only the image stabilization device 1 but also the lens barrel 100 by reducing the thickness in the optical axis direction at the collapsed state, as shown in FIG. 4.

It should be noted that the image stabilization device 1 is operated in an order reverse to the above-mentioned operation when the lens barrel 100 extends to the shooting state from the collapsed state. That is, the third group base plate 9 moves to the shooting state shown in FIG. 20 through the intermediate position in FIG. 21 from the collapsed state in FIG. 22.

Next, an operation when impact is applied to the image stabilization device 1 will be described with reference to FIG. 23 through FIG. 26.

Figure 23:
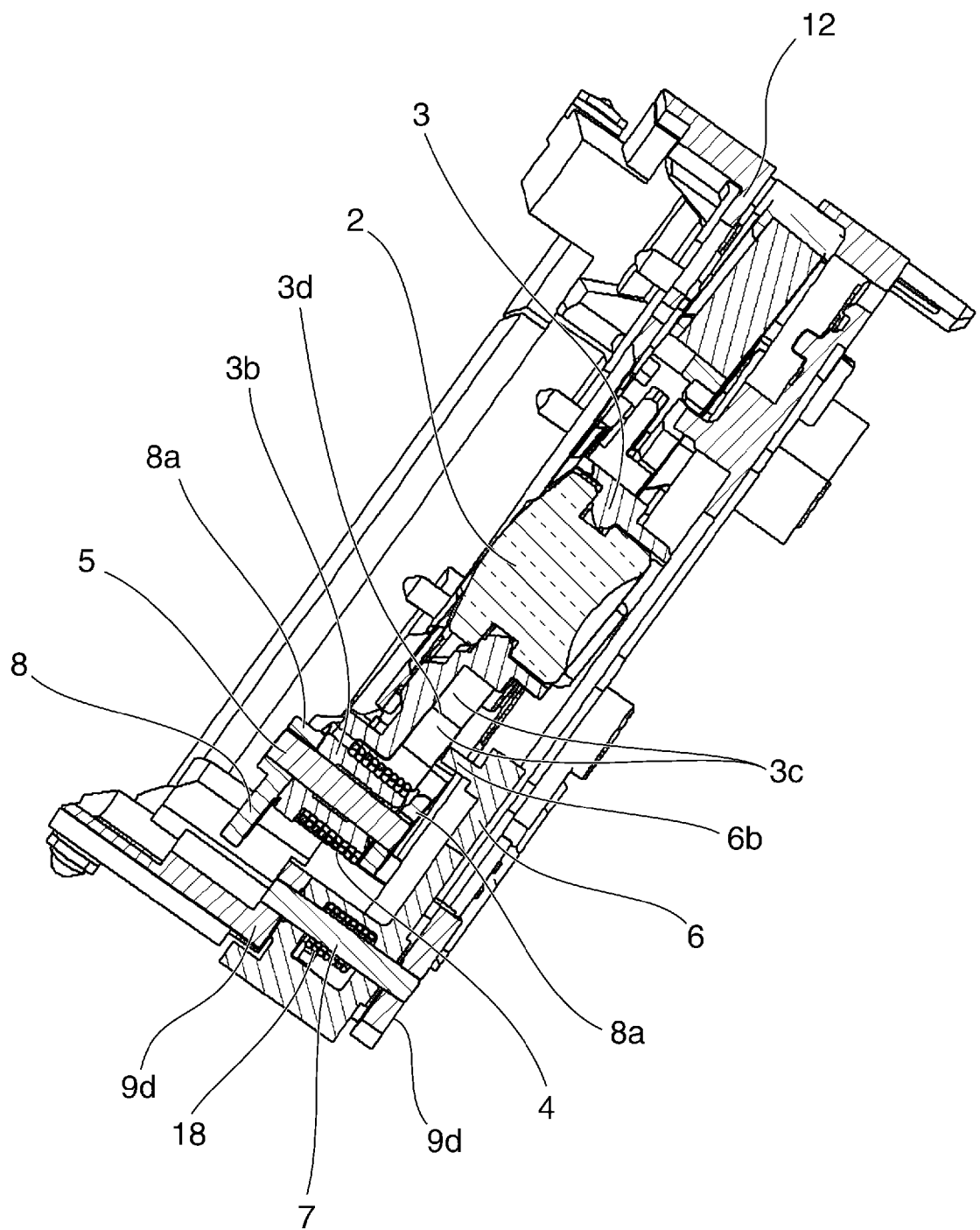
FIG. 23 is a sectional view showing the relationship between the third group holder and the third group lever shown in the FIG. 11 when impact is applied at the entering position on the assumption that a third-group-base-plate pin is not provided.
Figure 24:
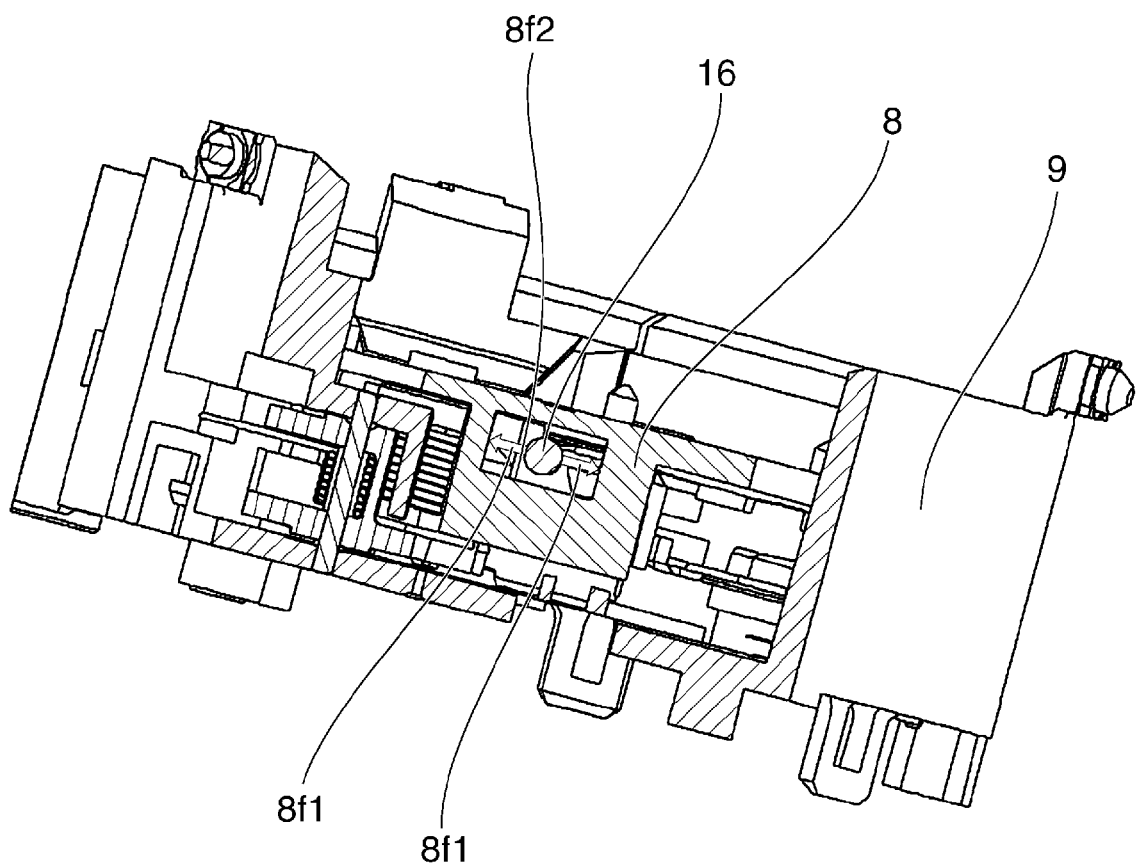
FIG. 24 is a partial sectional view showing the relationship between the third-group-base-plate pin included in the lens barrel shown in FIG. 2 and a movable space secured in a third group frame.
Figure 25:
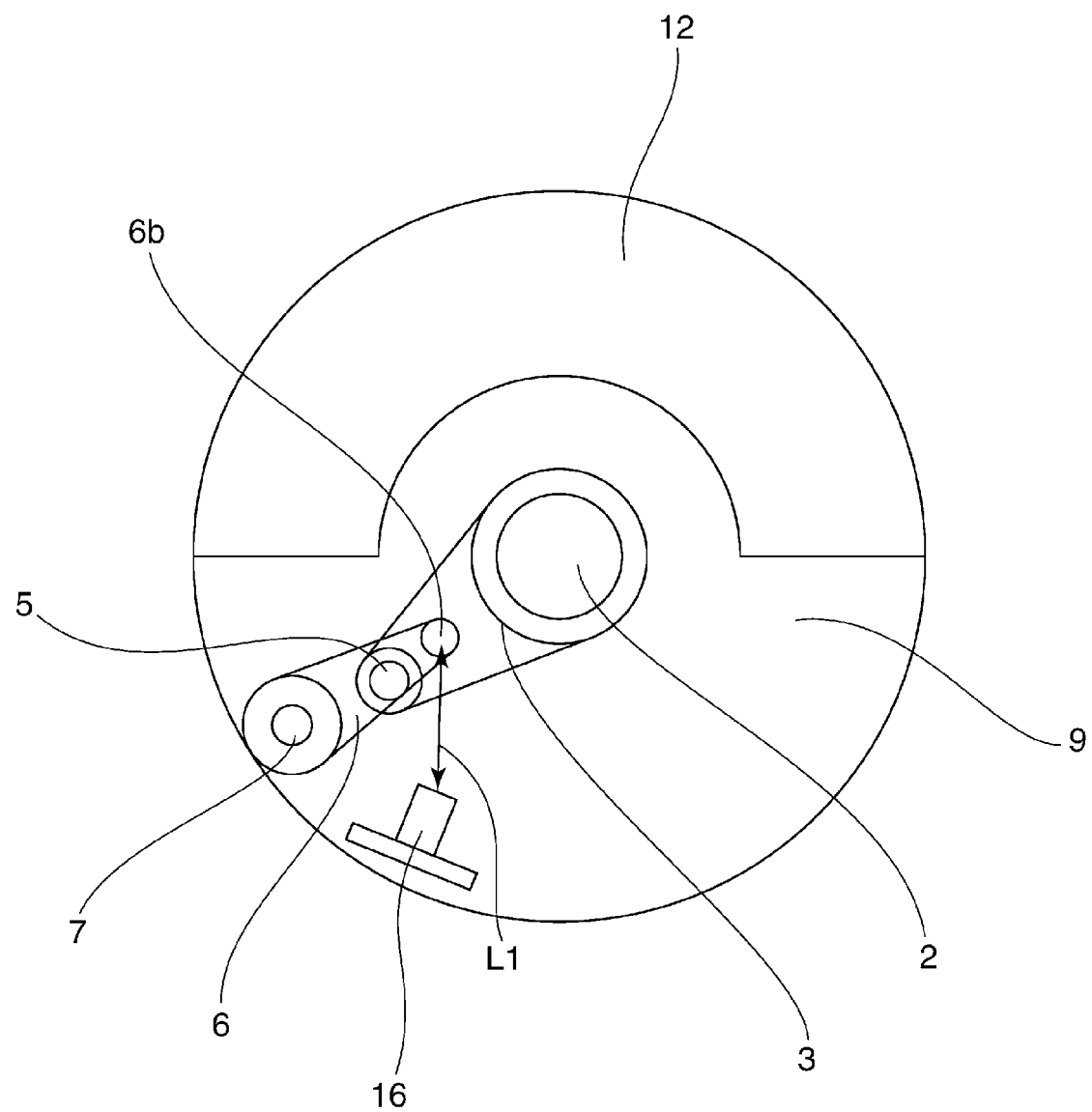
FIG. 25 is a schematic view showing the image stabilization device shown in FIG. 5 viewed from the front side when the third group holder is located at the entering position.
Figure 26:
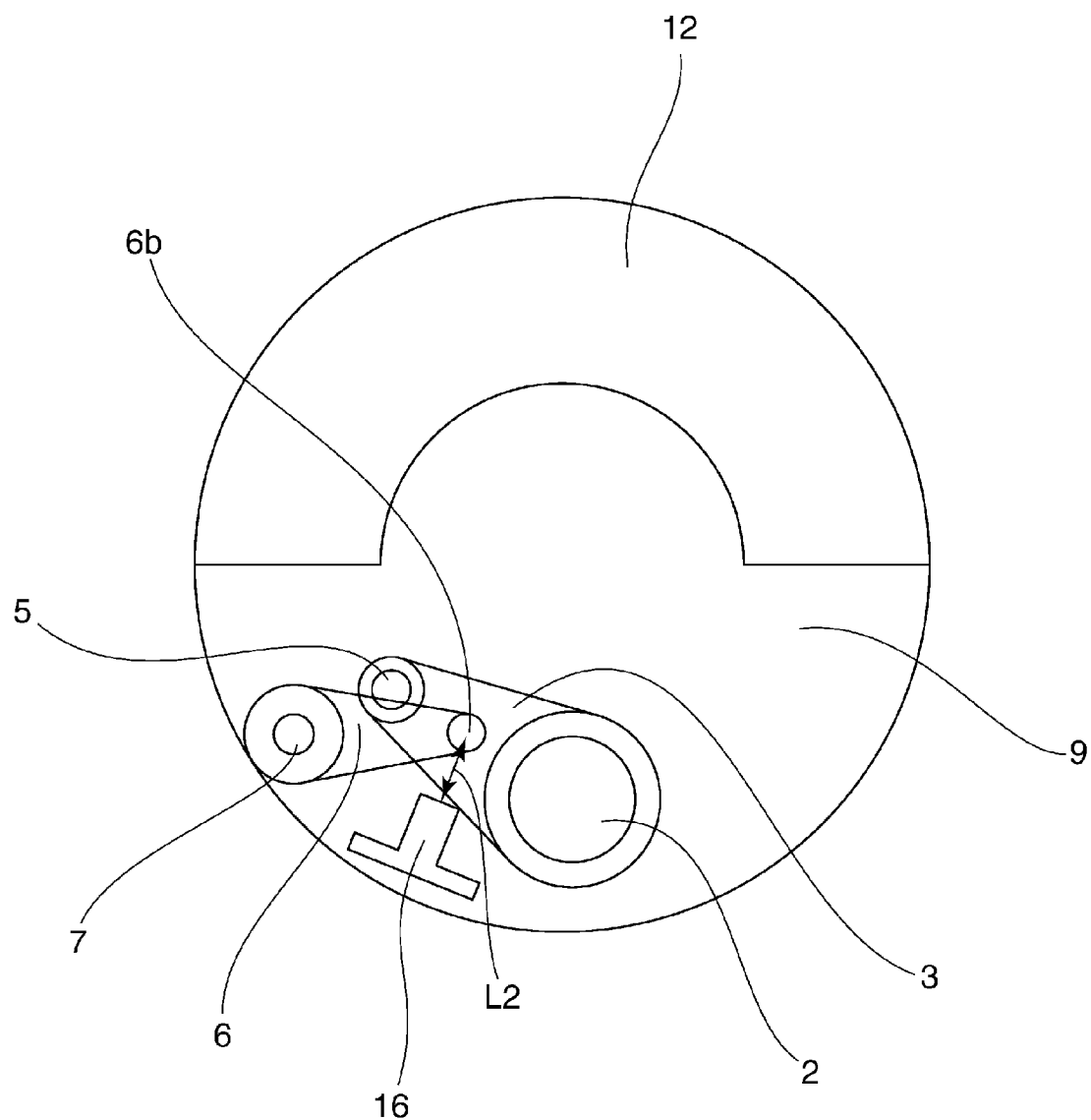
FIG. 26 is a schematic view showing the image stabilization device shown in FIG. 5 viewed from the front side when the third group holder is located at the retracted position.

FIG. 23 is a sectional view showing the relationship between the third group holder 3 and the third group lever 6 when impact is applied at the entering position on the assumption that the third-group-base-plate pin 16 is not provided. FIG. 24 is a partial sectional view showing the relationship between the third-group-base-plate pin 16 and the movable space 8/1 secured in a third group frame 8. FIG. 25 is a schematic view showing the image stabilization device 1 viewed from the front side when the third group holder 3 is located at the entering position. FIG. 26 is a schematic view showing the image stabilization device 1 viewed from the front side when the third group holder 3 is located at the retracted position.

When impact in the optical axis direction is applied to the image stabilization device 1, the thrust spring 14 extends, and one side of the third group frame 8 leaves the third group base plate 9 in the optical axis direction as shown in FIG. 23. At this time, the movement of the third group frame 8 in the optical axis direction is regulated by the Hall sensor holder 12 at the side that overlaps the Hall sensor holder 12 in the optical axis direction.

As mentioned above with reference to FIG. 4 etc., the image stabilization device 1 is arranged in the nearly cylindrical space between the second group holder 26 and the shutter unit 32 in the optical axis direction. Then, the thickness of the side containing the third group lens 2, the third group holder 3, and the third group frame 8 in the optical axis direction at the retracted position must be larger than the thickness of the side providing the permanent magnets 8d. Accordingly, the side of the third group frame 8 in which the third group lens 2 and the third group holder 3 are arranged at the retracted position cannot be overlapped with the Hall sensor holder 12 in the optical axis direction, when the image stabilization device 1 is made thin to nearly same thickness of the third group holder 3.

Namely, movement in the optical axis direction due to impact of the side of the third group frame 8 that does not overlap with the Hall sensor holder 12 in the optical axis direction cannot be regulated by the Hall sensor holder 12.

If the third group holder 3 moves in the direction leaving the third group base plate 9 in the optical axis direction as shown in FIG. 23, the retraction contact pin 6b of the third group lever 6 runs off the interference avoiding space 3d of the third group holder 3. Accordingly, when the third group lever 6 pivots, the retraction contact pin 6b does not contact with the retraction contact part 3c, and the retracting operation of the third group holder 3 becomes impossible.

In this embodiment, since the third-group-base-plate pin 16 provided in the third group base plate 9 contacts with the position regulating wall 8/2 of the third group frame 8 as shown in FIG. 11, FIG. 12, and FIG. 24, the movement of the third group frame 8 in the optical axis direction is regulated, which enables the retracting operation of the third group holder 3.

As shown in FIG. 11 and FIG. 12, the third-group-base-plate pin 16 is inserted into the movable space 8/1 at the position opposite to the magnets 8d, i.e., at the position that does not overlap with the Hall sensor holder 12 in the optical axis direction. This is because the third-group-base-plate pin 16 regulates the movement of the side of the third group frame 8 that does not overlap with the Hall sensor holder 12 in the optical axis direction.

Since the third-group-base-plate pin 16 is arranged at the position that does not overlap with the Hall sensor holder 12 in the optical axis direction in this way, the movement of the third group frame 8 in the optical axis direction is regulated, which prevents the retraction contact pin 6b of the third group lever 6 from running off the interference avoiding space 3d of the third group holder 3 even when impact is applied.

The arrangement of the third-group-base-plate pin 16 will be described with reference to FIG. 25 and FIG. 26.

The third-group-base-plate pin 16 is arranged so that a distance L1 (see FIG. 25) from the engagement position (the position of the retraction contact pin 6b) of the third group holder 3 and the third group lever 6 at the entering position to the third-group-base-plate pin 16 is longer than a distance L2 (see FIG. 26) from the engagement position of the third group holder 3 and the third group lever 6 at the retracted position to the third-group-base-plate pin 16. Moreover, the third-group-base-plate pin 16 is arranged between the third group lens 2 at the retracted position and the pivoting center (the holder shaft 5) of the third group holder 3.

Since the third-group-base-plate pin 16 is arranged between the third group lens 2 at the retracted position and the pivoting center of the third group holder 3, mutual interference among the third-group-base-plate pin 16, the third group lever 6, and the third group holder 3 at the retracted position is prevented.

Moreover, since the third-group-base-plate pin 16 is arranged so that the distance L1 is longer than the distance L2, the third-group-base-plate pin 16 is closer to the retraction contact pin 6b when the third group lever 6 is located at the retracted position than that at the shooting state. Such an arrangement of the third-group-base-plate pin 16 improves the effect of preventing the retraction contact pin 6b from running off the interference avoiding space 3d of the third group holder 3 when impact is applied at the retracted position.

Furthermore, since the third group lever 6 is independent from the third group base plate 9, the third group frame 8 is assembled to the third group base plate 9 while moving along the optical axis, which improves assembling workability. Moreover, since the third-group-base-plate pin 16 is arranged in the movable space 8/1 provided in the third group frame 8 as shown in FIG. 11 and FIG. 24, the thickness of the image stabilization device 1, which is arranged between the shutter unit 32 and the second group holder 26, in the optical axis direction is prevented from increasing.

As described above, this embodiment prevents the retraction contact pin 6b from running off the interference avoiding space 3d of the third group holder 3 because the third-group-base-plate pin 16 is arranged so that the distance L1 is longer than the distance L2. Accordingly, the image stabilization device 1 having high impact resistance is provided.

It should be noted that the invention is not limited to what has been described in the above-mentioned embodiment, quality of the material, a shape, a size, a formation, the number of elements, arrangement locations, etc., can be changed suitably unless it is deviated from the scope of the invention.

For example, although the above-mentioned embodiment shows the example that moves the third group holder 3 holding the third group lens 2 in the plane that intersects perpendicularly with the optical axis in a direction for correcting image blur, the third group holder 3 may rotate around an axis that intersects perpendicularly with the optical axis in a direction for correcting the image blur.

Moreover, although the above-mentioned embodiment shows the digital camera as an example of the optical device, the invention is not limited to this. The optical apparatus may be an image pickup apparatus like a digital video camera, an interchangeable lens for digital single lens reflex camera, or an observation apparatus like a binocular, a telescope, or a field scope, for example.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-260199, filed on Dec. 17, 2013, and No. 2014-229615, filed Nov. 12, 2014 which are hereby incorporated by reference herein in their entireties.

What is claimed is:

1. An optical apparatus comprising:
an optical element;
a holding member configured to hold the optical element, wherein the holding member is supported by a first member attached to a second member such that the optical element is movable between an entering position where the optical element enters into an optical path and a retracted position where the optical element is retracted from the optical path;
a driving member configured to engage with the holding member and to drive the holding member between the entering position and the retracted position of the optical element; and
a regulation member configured to regulate a moving amount of the first member with respect to the second member,
wherein the regulation member is arranged so that a distance from an engagement position of the holding member and the driving member, when the optical element is at the entering position, to the regulation member is longer than a distance from the engagement position of the holding member and the driving member, when the optical element is at the retracted position, to the regulation member, and
wherein when the holding member moves toward a subject, the regulation member contacts a position regulating wall of the first member in a direction of an optical axis of the optical element before a retraction contact pin of the driving member is disengaged with an interface avoiding space of the holding member in the direction of the optical axis of the optical element.

2. The optical apparatus according to claim 1, wherein the driving member is movably attached to the second member.

3. The optical apparatus according to claim 1, wherein the first member is attached to the second member so that the first member is movable in a direction that intersects an optical axis of the optical element.

4. The optical apparatus according to claim 3, wherein the regulation member regulates the moving amount of the first member when the first member moves in a direction of the optical axis of the optical element.

5. The optical apparatus according to claim 4, wherein the regulation member is formed so as to protrude towards the first member from the second member.

6. The optical apparatus according to claim 4, wherein a hole is formed in the first member, and
wherein the regulation member is attached to the second member and is inserted into the hole.

7. An optical apparatus comprising:
an optical element;
a holding member configured to hold the optical element, wherein the holding member is supported by a first member attached to a second member such that the optical element is rotatable between an entering position where the optical element enters into an optical path and a retracted position where the optical element is retracted from the optical path;
a driving member configured to engage with the holding member and to drive the holding member between the entering position and the retracted position of the optical element; and
a regulation member configured to regulate a moving amount of the first member with respect to the second member,
wherein the regulation member is arranged between the optical element at the retracted position and the rotation center of the holding member, and
wherein when the holding member moves toward a subject, the regulation member contacts a position regulating wall of the first member in a direction of an optical axis of the optical element before a retraction contact pin of the driving member is disengaged with an interface avoiding space of the holding member in the direction of the optical axis of the optical element.

8. The optical apparatus according to claim 7, wherein the driving member is movably attached to the second member.

9. The optical apparatus according to claim 7, wherein the first member is attached to the second member so that the first member is movable in a direction that intersects an optical axis of the optical element.

10. The optical apparatus according to claim 9, wherein the regulation member regulates the moving amount of the first member when the first member moves in a direction of the optical axis of the optical element.

11. The optical apparatus according to claim 10, wherein the regulation member is formed so as to protrude towards the first member from the second member.

12. The optical apparatus according to claim 10, wherein a hole is formed in the first member, and
wherein the regulation member is attached to the second member and is inserted into the hole.

* * * * *